United States Patent [19]

Yamashita et al.

[11] Patent Number: 5,673,081
[45] Date of Patent: Sep. 30, 1997

[54] METHOD OF CONVERTING TWO-DIMENSIONAL IMAGES INTO THREE-DIMENSIONAL IMAGES

[75] Inventors: Shugo Yamashita, Osaka; Toshiyuki Okino, Kadoma; Toshiya Iinuma; Akihiro Maenaka, both of Moriguchi; Haruhiko Murata, Takatsuki; Yukio Mori, Kadoma, all of Japan

[73] Assignee: Sanyo Electric Co., Ltd., Osaka, Japan

[21] Appl. No.: 561,420

[22] Filed: Nov. 21, 1995

[30] Foreign Application Priority Data

Nov. 22, 1994 [JP] Japan .................................. 6-287657
Feb. 17, 1995 [JP] Japan .................................. 7-029888

[51] Int. Cl.[6] .................................................. H04N 13/00
[52] U.S. Cl. .............................. 348/42; 348/43; 348/44; 348/49; 348/50
[58] Field of Search ........................... 348/50, 56, 699, 348/420

[56] References Cited

U.S. PATENT DOCUMENTS 4,562,463 12/1985 Lipton .................................. 348/56
4,636,862 1/1987 Hatori et al. ......................... 348/420
4,754,327 6/1988 Lippert ................................. 348/50
5,111,511 5/1992 Ishii et al. ............................. 382/107
5,510,832 4/1996 Garcia .................................. 348/56

OTHER PUBLICATIONS

"Head–Tracking Stereo Display: Experiments and Applications", PALEY, *Proceedings of the SPIE*, vol. 1669, 1992, pp. 84–89.

*Primary Examiner*—Howard W. Britton
*Assistant Examiner*—Frank Snow
*Attorney, Agent, or Firm*—Nikaido Marmelstein Murray & Oram LLP

[57] ABSTRACT

A method of converting two-dimensional images into three-dimensional images. When the movement of a main image is fast, a main image signal is written into field memories for each field. When the movement of the main image is slow, the main image signal is written into the field memories at intervals of a predetermined number of fields. An image to be read out as a sub-image from the field memories is determined on the basis of the speed of the movement of the main image.

10 Claims, 34 Drawing Sheets

FIG 6.

| d2−1 | d2−2 | d2−3 | Pd |
|---|---|---|---|
| 3 | 3 | 5 | 3 |
| 3 | 5 | 5 | 3 |
| 5 | 5 | 5 | 5 |
| ⋮ | ⋮ | ⋮ | ⋮ |

FIG7

| d2−1 | d2−2 | d2−3 | Pd |
|---|---|---|---|
| 3 | 3 | 4 | 3 |
| 3 | 4 | 5 | 3 |
| 4 | 5 | 6 | 3→4 |
| ⋮ | ⋮ | ⋮ | ⋮ |

FIG. 8

SUITABLE FIELD DELAY(SMALL)
(d=±1～±3)

| THROUGH | MEMORY | | |
|---|---|---|---|
| | A | B | C |
| 7 | 4/7 | 5 | 6 |
| 8 | 7 | 5/8 | 6 |
| 9 | 7 | 8 | 6/9 |
| 10 | 7/10 | 8 | 9 |
| 11 | 10 | 8/11 | 9 |
| 12 | 10 | 11 | 9/12 |
| 13 | 10/13 | 11 | 12 |
| 14 | 13 | 11/14 | 12 |

FIG. 9

SUITABLE FIELD DELAY(LARGE)
($d = \pm 4 \sim \pm 6$)

| THROUGH | MEMORY | | |
|---|---|---|---|
| | A | B | C |
| 7 | 2 | 4 | 6 |
| 8 | 2/8 | 4 | 6 |
| 9 | 8 | 4 | 6 |
| 10 | 8 | 4/10 | 6 |
| 11 | 8 | 10 | 6 |
| 12 | 8 | 10 | 6/12 |
| 13 | 8 | 10 | 12 |
| 14 | 8/14 | 10 | 12 |

FIG. 11

SUITABLE FIELD DELAY = 1

| THROUGH | MEMORY | | | ACTUAL FIELD DELAY | RELATIVE NUMBER OF READ MEMORY |
|---|---|---|---|---|---|
| | A | B | C | | |
| 4 | 1/4 | 2 | (3) | 1 | 1 |
| 5 | (4) | 2/5 | 3 | 1 | 1 |
| 6 | 4 | (5) | 3/6 | 1 | 1 |
| 7 | 4/7 | 5 | (6) | 1 | 1 |
| 8 | (7) | 5/8 | 6 | 1 | 1 |
| 9 | 7 | (8) | 6/9 | 1 | 1 |
| 10 | 7/10 | 8 | (9) | 1 | 1 |

FIG. 12

SUITABLE FIELD DELAY = 2

| THROUGH | MEMORY | | | ACTUAL FIELD DELAY | RELATIVE NUMBER OF READ MEMORY |
|---|---|---|---|---|---|
| | A | B | C | | |
| 4 | 1/4 | (2) | 3 | 2 | 2 |
| 5 | 4 | 2/5 | (3) | 2 | 2 |
| 6 | (4) | 5 | 3/6 | 2 | 2 |
| 7 | 4/7 | (5) | 6 | 2 | 2 |
| 8 | 7 | 5/8 | (6) | 2 | 2 |
| 9 | (7) | 8 | 6/9 | 2 | 2 |
| 10 | 7/10 | (8) | 9 | 2 | 2 |

FIG. 13

SUITABLE FIELD DELAY = 3

| THROUGH | MEMORY | | | ACTUAL FIELD DELAY | RELATIVE NUMBER OF READ MEMORY |
|---|---|---|---|---|---|
| | A | B | C | | |
| 4 | (1)/4 | 2 | 3 | 3 | 3 |
| 5 | 4 | (2)/5 | 3 | 3 | 3 |
| 6 | 4 | 5 | (3)/6 | 3 | 3 |
| 7 | (4)/7 | 5 | 6 | 3 | 3 |
| 8 | 7 | (5)/8 | 6 | 3 | 3 |
| 9 | 7 | 8 | (6)/9 | 3 | 3 |
| 10 | (7)/10 | 8 | 9 | 3 | 3 |

FIG. 14

SUITABLE FIELD DELAY = 4

| THROUGH | MEMORY | | | ACTUAL FIELD DELAY | RELATIVE NUMBER OF READ MEMORY |
|---|---|---|---|---|---|
| | A | B | C | | |
| 6 | 0/6 | (2) | 4 | 4 | 2 |
| 7 | 6 | 2 | (4) | 3 | 2 |
| 8 | 6 | 2/8 | (4) | 4 | 2 |
| 9 | (6) | 8 | 4 | 3 | 2 |
| 10 | (6) | 8 | 4/10 | 4 | 2 |
| 11 | 6 | (8) | 10 | 3 | 2 |
| 12 | 6/12 | (8) | 10 | 4 | 2 |
| 13 | 12 | 8 | (10) | 3 | 2 |
| 14 | 12 | 8/14 | (10) | 4 | 2 |
| 15 | (12) | 14 | 10 | 3 | 2 |
| 16 | (12) | 14 | 10/16 | 4 | 2 |
| 17 | 12 | (14) | 16 | 3 | 2 |
| 18 | 12/18 | (14) | 16 | 4 | 2 |

FIG. 15

SUITABLE FIELD DELAY = 5

| THROUGH | MEMORY | | | ACTUAL FIELD DELAY | RELATIVE NUMBER OF READ MEMORY |
|---|---|---|---|---|---|
| | A | B | C | | |
| 6 | 0/6 | (2) | 4 | 4 | 2 |
| 7 | 6 | (2) | 4 | 5 | 3 |
| 8 | 6 | 2/8 | (4) | 4 | 2 |
| 9 | 6 | 8 | (4) | 5 | 3 |
| 10 | (6) | 8 | 4/10 | 4 | 2 |
| 11 | (6) | 8 | 10 | 5 | 3 |
| 12 | 6/12 | (8) | 10 | 4 | 2 |
| 13 | 12 | (8) | 10 | 5 | 3 |
| 14 | 12 | 8/14 | (10) | 4 | 2 |
| 15 | 12 | 14 | (10) | 5 | 3 |
| 16 | (12) | 14 | 10/16 | 4 | 2 |
| 17 | (12) | 14 | 16 | 5 | 3 |
| 18 | 12/18 | (14) | 16 | 4 | 2 |

FIG. 16

SUITABLE FIELD DELAY=6

| THROUGH | MEMORY | | | ACTUAL FIELD DELAY | RELATIVE NUMBER OF READ MEMORY |
| --- | --- | --- | --- | --- | --- |
| | A | B | C | | |
| 6 | (0)/6 | 2 | 4 | 6 | 3 |
| 7 | 6 | (2) | 4 | 5 | 3 |
| 8 | 6 | (2)/8 | 4 | 6 | 3 |
| 9 | 6 | 8 | (4) | 5 | 3 |
| 10 | 6 | 8 | (4)/10 | 6 | 3 |
| 11 | (6) | 8 | 10 | 5 | 3 |
| 12 | (6)/12 | 8 | 10 | 6 | 3 |
| 13 | 12 | (8) | 10 | 5 | 3 |
| 14 | 12 | (8)/14 | 10 | 6 | 3 |
| 15 | 12 | 14 | (10) | 5 | 3 |
| 16 | 12 | 14 | (10)/16 | 6 | 3 |
| 17 | (12) | 14 | 16 | 5 | 3 |
| 18 | (12)/18 | 14 | 16 | 6 | 3 |

FIG. 17

SUITABLE FIELD DELAY (0→1→2→3)

| SUITABLE FIELD DELAY | THROUGH | MEMORY | | | ACTUAL FIELD DELAY | RELATIVE NUMBER OF READ MEMORY |
|---|---|---|---|---|---|---|
| | | A | B | C | | |
| 0 | 4 | 1/(4) | 2 | 3 | 0 | 0 |
| 0 | 5 | 4 | 2/(5) | 3 | 0 | 0 |
| 1 | 6 | 4 | (5) | 3/6 | 1 | 1 |
| 1 | 7 | 4/7 | 5 | (6) | 1 | 1 |
| 1 | 8 | (7) | 5/8 | 6 | 1 | 1 |
| 1 | 9 | 7 | (8) | 6/9 | 1 | 1 |
| 2 | 10 | 7/10 | (8) | 9 | 2 | 2 |
| 2 | 11 | 10 | 8/11 | (9) | 2 | 2 |
| 2 | 12 | (10) | 11 | 9/12 | 2 | 2 |
| 2 | 13 | 10/13 | (11) | 12 | 2 | 2 |
| 3 | 14 | 13 | (11)/14 | 12 | 3 | 3 |
| 3 | 15 | 13 | 14 | (12)/15 | 3 | 3 |

FIG. 18

SUITABLE FIELD DELAY (3→2→1→0)

| SUITABLE FIELD DELAY | THROUGH | MEMORY | | | ACTUAL FIELD DELAY | RELATIVE NUMBER OF READ MEMORY |
| --- | --- | --- | --- | --- | --- | --- |
| | | A | B | C | | |
| 3 | 4 | (1)/4 | 2 | 3 | 3 | 3 |
| 3 | 5 | 4 | (2)/5 | 3 | 3 | 3 |
| 2 | 6 | (4) | 5 | 3/6 | 2 | 2 |
| 2 | 7 | 4/7 | (5) | 6 | 2 | 2 |
| 2 | 8 | 7 | 5/8 | (6) | 2 | 2 |
| 2 | 9 | (7) | 8 | 6/9 | 2 | 2 |
| 1 | 10 | 7/10 | 8 | (9) | 1 | 1 |
| 1 | 11 | (10) | 8/11 | 9 | 1 | 1 |
| 1 | 12 | 10 | (11) | 9/12 | 1 | 1 |
| 1 | 13 | 10/13 | 11 | (12) | 1 | 1 |
| 0 | 14 | 13 | 11/(14) | 12 | 0 | 0 |
| 0 | 15 | 13 | 14 | 12/(15) | 0 | 0 |

FIG. 19

SUITABLE FIELD DELAY (4→5→6)

| SUITABLE FIELD DELAY | THROUGH | MEMORY | | | ACTUAL FIELD DELAY | RELATIVE NUMBER OF READ MEMORY |
|---|---|---|---|---|---|---|
| | | A | B | C | | |
| 4 | 6 | 0/6 | (2) | 4 | 4 | 2 |
| 4 | 7 | 6 | 2 | (4) | 3 | 2 |
| 4 | 8 | 6 | 2/8 | (4) | 4 | 2 |
| 4 | 9 | (6) | 8 | 4 | 3 | 2 |
| 5 | 10 | (6) | 8 | 4/10 | 4 | 2 |
| 5 | 11 | (6) | 8 | 10 | 5 | 3 |
| 5 | 12 | 6/12 | (8) | 10 | 4 | 2 |
| 5 | 13 | 12 | (8) | 10 | 5 | 3 |
| 6 | 14 | 12 | (8)/14 | 10 | 6 | 3 |
| 6 | 15 | 12 | 14 | (10) | 5 | 3 |
| 6 | 16 | 12 | 14 | (10)/16 | 6 | 3 |
| 6 | 17 | (12) | 14 | 16 | 5 | 3 |
| 6 | 18 | (12)/18 | 14 | 16 | 6 | 3 |

FIG. 20

SUITABLE FIELD DELAY (6→5→4)

| SUITABLE FIELD DELAY | THROUGH | MEMORY | | | ACTUAL FIELD DELAY | RELATIVE NUMBER OF READ MEMORY |
|---|---|---|---|---|---|---|
| | | A | B | C | | |
| 6 | 6 | (0)/6 | 2 | 4 | 6 | 3 |
| 6 | 7 | 6 | (2) | 4 | 5 | 3 |
| 6 | 8 | 6 | (2)/8 | 4 | 6 | 3 |
| 6 | 9 | 6 | 8 | (4) | 5 | 3 |
| 5 | 10 | (6) | 8 | 4/10 | 4 | 2 |
| 5 | 11 | (6) | 8 | 10 | 5 | 3 |
| 5 | 12 | 6/12 | (8) | 10 | 4 | 2 |
| 5 | 13 | 12 | (8) | 10 | 5 | 3 |
| 4 | 14 | 12 | 8/14 | (10) | 4 | 2 |
| 4 | 15 | (12) | 14 | 10 | 3 | 2 |
| 4 | 16 | (12) | 14 | 10/16 | 4 | 2 |
| 4 | 17 | 12 | (14) | 16 | 3 | 2 |
| 4 | 18 | 12/18 | (14) | 16 | 4 | 2 |

FIG. 21

SUITABLE FIELD DELAY (3→4)

| SUITABLE FIELD DELAY | THROUGH | MEMORY | | | ACTUAL FIELD DELAY | RELATIVE NUMBER OF READ MEMORY |
|---|---|---|---|---|---|---|
| | | A | B | C | | |
| 3 | 4 | (1)/4 | 2 | 3 | 3 | 3 |
| 3 | 5 | 4 | (2)/5 | 3 | 3 | 3 |
| 3 | 6 | 4 | 5 | (3)/6 | 3 | 3 |
| 4 | 7 | (4) | 5 | 6 | 3 | 3 |
| 4 | 8 | 4/8 | (5) | 6 | 3 | 2 |
| 4 | 9 | 8 | 5 | (6) | 3 | 2 |
| 4 | 10 | 8 | 5/10 | (6) | 4 | 2 |
| 4 | 11 | (8) | 10 | 6 | 3 | 2 |
| 4 | 12 | (8) | 10 | 6/12 | 4 | 2 |
| 4 | 13 | 8 | (10) | 12 | 3 | 2 |
| 4 | 14 | 8/14 | (10) | 12 | 4 | 2 |

FIG. 22

SUITABLE FIELD DELAY (4→3)

| SUITABLE FIELD DELAY | THROUGH | MEMORY | | | ACTUAL FIELD DELAY | RELATIVE NUMBER OF READ MEMORY |
|---|---|---|---|---|---|---|
| | | A | B | C | | |
| 4 | 6 | 0/6 | (2) | 4 | 4 | 2 |
| 4 | 7 | 6 | 2 | (4) | 3 | 2 |
| 4 | 8 | 6 | 2/8 | (4) | 4 | 2 |
| 4 | 9 | (6) | 8 | 4 | 3 | 2 |
| 3 | 10 | (6) | 8 | 4/10 | 4 | 2 |
| 3 | 11 | 6/11 | (8) | 10 | 3 | 2 |
| 3 | 12 | 11 | (8)/12 | 10 | 4 | 3 |
| 3 | 13 | 11 | 12 | (10)/13 | 3 | 3 |
| 3 | 14 | (11)/14 | 12 | 13 | 3 | 3 |
| 3 | 15 | 14 | (12)/15 | 13 | 3 | 3 |

FIG. 23

SUITABLE FIELD DELAY (4→3)

| SUITABLE FIELD DELAY | THROUGH | MEMORY | | | ACTUAL FIELD DELAY | RELATIVE NUMBER OF READ MEMORY |
|---|---|---|---|---|---|---|
| | | A | B | C | | |
| 4 | 6 | 0/6 | (2) | 4 | 4 | 2 |
| 4 | 7 | 6 | 2 | (4) | 5 | 2 |
| 4 | 8 | 6 | 2/8 | (4) | 4 | 2 |
| 3 | 9 | (6) | 8 | 4/9 | 3 | 2 |
| 3 | 10 | (6)/10 | 8 | 9 | 4 | 3 |
| 3 | 11 | 10 | (8)/11 | 9 | 3 | 3 |
| 3 | 12 | 10 | 11 | (9)/12 | 3 | 3 |
| 3 | 13 | (10)/13 | 11 | 12 | 3 | 3 |
| 3 | 14 | 13 | (11)/14 | 12 | 3 | 3 |
| 3 | 15 | 13 | 14 | (12)/15 | 3 | 3 |

FIG. 24

| THROUGH | MEMORY | | | | | |
|---|---|---|---|---|---|---|
| | A | B | C | D | E | F |
| 7 | 1/7 | 2 | 3 | 4 | 5 | 6 |
| 8 | 7 | 2/8 | 3 | 4 | 5 | 6 |
| 9 | 7 | 8 | 3/9 | 4 | 5 | 6 |
| 10 | 7 | 8 | 9 | 4/10 | 5 | 6 |
| 11 | 7 | 8 | 9 | 10 | 5/11 | 6 |
| 12 | 7 | 8 | 9 | 10 | 11 | 6/12 |
| 13 | 7/13 | 8 | 9 | 10 | 11 | 12 |
| 14 | 13 | 8/14 | 9 | 10 | 11 | 12 |

FIG. 27
SUITABLE FIELD DELAY = 1

| THROUGH | MEMORY | | | | ACTUAL FIELD DELAY | RELATIVE NUMBER OF READ MEMORY AND TYPE OF WRITING |
| --- | --- | --- | --- | --- | --- | --- |
| | A | B | C | D | | |
| [6] | 2/6 | 3 | 4 | (5) | 1 | 0,1/w |
| [7] | (6) | 3/7 | 4 | 5 | 1 | 0,1/w |
| [8] | 6 | (7) | 4/8 | 5 | 1 | 0,1/w |
| [9] | 6 | 7 | (8) | 5/9 | 1 | 0,1/w |
| [10] | 6/10 | 7 | 8 | (9) | 1 | 0,1/w |
| [11] | (10) | 7/11 | 8 | 9 | 1 | 0,1/w |
| [12] | 10 | (11) | 8/12 | 9 | 1 | 0,1/w |

FIG. 28
SUITABLE FIELD DELAY = 2

| THROUGH | MEMORY | | | | ACTUAL FIELD DELAY | RELATIVE NUMBER OF READ MEMORY AND TYPE OF WRITING |
| --- | --- | --- | --- | --- | --- | --- |
| | A | B | C | D | | |
| [6] | 2/6 | 3 | (4) | 5 | 2 | 0,2/w |
| [7] | 6 | 3/7 | 4 | (5) | 2 | 0,2/w |
| [8] | (6) | 7 | 4/8 | 5 | 2 | 0,2/w |
| [9] | 6 | (7) | 8 | 5/9 | 2 | 0,2/w |
| [10] | 6/10 | 7 | (8) | 9 | 2 | 0,2/w |
| [11] | 10 | 7/11 | 8 | (9) | 2 | 0,2/w |
| [12] | (10) | 11 | 8/12 | 9 | 2 | 0,2/w |

FIG. 29

SUITABLE FIELD DELAY = 3

| THROUGH | MEMORY | | | | ACTUAL FIELD DELAY | RELATIVE NUMBER OF READ MEMORY AND TYPE OF WRITING |
|---|---|---|---|---|---|---|
| | A | B | C | D | | |
| [6] | 2/6 | (3) | 4 | 5 | 3 | 0,3/w |
| [7] | 6 | 3/7 | (4) | 5 | 3 | 0,3/w |
| [8] | 6 | 7 | 4/8 | (5) | 3 | 0,3/w |
| [9] | (6) | 7 | 8 | 5/9 | 3 | 0,3/w |
| [10] | 6/10 | (7) | 8 | 9 | 3 | 0,3/w |
| [11] | 10 | 7/11 | (8) | 9 | 3 | 0,3/w |
| [12] | 10 | 11 | 8/12 | (9) | 3 | 0,3/w |

FIG. 30

SUITABLE FIELD DELAY = 4

| THROUGH | MEMORY | | | | ACTUAL FIELD DELAY | RELATIVE NUMBER OF READ MEMORY AND TYPE OF WRITING |
|---|---|---|---|---|---|---|
| | A | B | C | D(=x) | | |
| [6] | 0/6 | (2) | 4 | 5 | 4 | 0,2/w |
| 7 | [6] | (2) | 4 | 5/7 | 4 | 1,3/x |
| [8] | 6 | 2/8 | (4) | 7 | 4 | 0,2/w |
| 9 | 6 | [8] | (4) | 7/9 | 4 | 1,3/x |
| [10] | (6) | 8 | 4/10 | 9 | 4 | 0,2/w |
| 11 | (6) | 8 | [10] | 9/11 | 4 | 1,3/x |
| [12] | 6/12 | (8) | 10 | 11 | 4 | 0,2/w |
| 13 | [12] | (8) | 10 | 11/13 | 4 | 1,3/x |
| [14] | 12 | 8/14 | (10) | 13 | 4 | 0,2/w |
| 15 | 12 | [14] | (10) | 13/15 | 4 | 1,3/x |
| [16] | (12) | 14 | 10/16 | 15 | 4 | 0,2/w |
| 17 | (12) | 14 | [16] | 15/17 | 4 | 1,3/x |
| [18] | 12/18 | (14) | 16 | 17 | 4 | 0,2/w |

FIG. 31

SUITABLE FIELD DELAY = 5

| THROUGH | MEMORY | | | | ACTUAL FIELD DELAY | RELATIVE NUMBER OF READ MEMORY AND TYPE OF WRITING |
|---|---|---|---|---|---|---|
| | A | B | C | D(=x) | | |
| 6 | (0)/6 | 2 | 4 | [5] | 5 | x,3/w |
| [7] | 6 | (2) | 4 | 5/7 | 5 | 0,3/x |
| 8 | 6 | (2)/8 | 4 | [7] | 5 | x,3/w |
| [9] | 6 | 8 | (4) | 7/9 | 5 | 0,3/x |
| 10 | 6 | 8 | (4)/10 | [9] | 5 | x,3/w |
| [11] | (6) | 8 | 10 | 9/11 | 5 | 0,3/x |
| 12 | (6)/12 | 8 | 10 | [11] | 5 | x,3/w |
| [13] | 12 | (8) | 10 | 11/13 | 5 | 0,3/x |
| 14 | 12 | (8)/14 | 10 | [13] | 5 | x,3/w |
| [15] | 12 | 14 | (10) | 13/15 | 5 | 0,3/x |
| 16 | 12 | 14 | (10)/16 | [15] | 5 | x,3/w |
| [17] | (12) | 14 | 16 | 15/17 | 5 | 0,3/x |
| 18 | (12)/18 | 14 | 16 | [17] | 5 | x,3/w |

FIG. 32

SUITABLE FIELD DELAY=6

| THROUGH | MEMORY | | | | ACTUAL FIELD DELAY | RELATIVE NUMBER OF READ MEMORY AND TYPE OF WRITING |
|---|---|---|---|---|---|---|
| | A | B | C | D | | |
| [6] | (0) | 2 | 4 | −2/6 | 6 | 0,3/w |
| 7 | (0) | 2 | 4 | [6] | 6 | 1,4/n |
| [8] | 0/8 | (2) | 4 | 6 | 6 | 0,3/w |
| 9 | [8] | (2) | 4 | 6 | 6 | 1,4/n |
| [10] | 8 | 2/10 | (4) | 6 | 6 | 0,3/w |
| 11 | 8 | [10] | (4) | 6 | 6 | 1,4/n |
| [12] | 8 | 10 | 4/12 | (6) | 6 | 0,3/w |
| 13 | 8 | 10 | [12] | (6) | 6 | 1,4/n |
| [14] | (8) | 10 | 12 | 6/14 | 6 | 0,3/w |
| 15 | (8) | 10 | 12 | [14] | 6 | 1,4/n |
| [16] | 8/16 | (10) | 12 | 14 | 6 | 0,3/w |
| 17 | [16] | (10) | 12 | 14 | 6 | 1,4/n |
| [18] | 16 | 10/18 | (12) | 14 | 6 | 0,3/w |

FIG. 33

SUITABLE FIELD DELAY (3→4→3)

| SUITABLE FIELD DELAY | THROUGH | MEMORY | | | | ACTUAL FIELD DELAY | RELATIVE NUMBER OF READ MEMORY AND TYPE OF WRITING |
|---|---|---|---|---|---|---|---|
| | | A | B | C(=x) | D | | |
| 3 | [5] | 1/5 | (2) | 3 | 4 | 3 | 0,3/w |
| 3 | [6] | 5 | 2/6 | (3) | 4 | 3 | 0,3/w |
| 3 | [7] | 5 | 6 | 3/7 | (4) | 3 | 0,3/w |
| 4 | [8] | 5 | 6 | 7 | (4)/8 | 4 | 0,3/w |
| 4 | [9] | (5) | 6 | 7/9 | 8 | 4 | 0,3/x |
| 4 | 10 | (5)/10 | 6 | [9] | 8 | 4 | x,3/w |
| 4 | 11 | [10] | (6) | 9/11 | 8 | 4 | 1,3/x |
| 4 | [12] | 10 | 6/12 | 11 | (8) | 4 | 0,2/w |
| 3 | [13] | (10) | 12 | 11 | 8/13 | 3 | 0,2/w |
| 3 | [14] | 10/14 | 12 | (11) | 13 | 3 | 0,x/w |
| 3 | [15] | 14 | (12)/15 | 11 | 13 | 3 | 0,3/w |
| 3 | [16] | 14 | 15 | 11/16 | (13) | 3 | 0,3/x |
| 3 | [17] | (14) | 15 | 16 | 13/17 | 3 | 0,3/w |

FIG. 34

SUITABLE FIELD DELAY (4→3)

| SUITABLE FIELD DELAY | THROUGH | MEMORY | | | | ACTUAL FIELD DELAY | RELATIVE NUMBER OF READ MEMORY AND TYPE OF WRITING |
| --- | --- | --- | --- | --- | --- | --- | --- |
| | | A | B | C(=x) | D | | |
| 4 | [12] | 10 | 6/12 | 11 | (8) | 4 | 0,2/w |
| 4 | 13 | 10 | [12] | 11/13 | (8) | 4 | 1,3/x |
| 4,3 | [14] | (10) | 12 | 13 | 8/14 | 4 | 0,2/w |
| 3 | [15] | 10/15 | (12) | 13 | 14 | 3 | 0,2/w |
| 3 | [16] | 15 | 12/16 | (13) | 14 | 3 | 0,x/w |
| 3 | [17] | 15 | 16 | 13/17 | (14) | 3 | 0,3/x |
| 3 | [18] | (15) | 16 | 17 | 14/18 | 3 | 0,3/w |

FIG. 35

SUITABLE FIELD DELAY (4→3)

| SUITABLE FIELD DELAY | THROUGH | MEMORY | | | | ACTUAL FIELD DELAY | RELATIVE NUMBER OF READ MEMORY AND TYPE OF WRITING |
|---|---|---|---|---|---|---|---|
| | | A | B | C(=x) | D | | |
| 4 | [12] | 10 | 6/12 | 11 | (8) | 4 | 0,2/w |
| 4 | 13 | 10 | [12] | 11/13 | (8) | 4 | 1,3/x |
| 4 | [14] | (10) | 12 | 13 | 8/14 | 4 | 0,2/w |
| 4 | 15 | (10) | 12 | 13/15 | [14] | 4 | 1,3/x |
| 4 | [16] | 10/16 | (12) | 15 | 14 | 4 | 0,2/w |
| 3 | [17] | 16 | 12/17 | 15 | (14) | 3 | 0,2/w |
| 3 | [18] | 16 | 17 | (15)/18 | 14 | 3 | 0,x/x |
| 3 | [19] | (16) | 17 | 18 | 14/19 | 3 | 0,3/w |
| 3 | [20] | 16/20 | (17) | 18 | 19 | 3 | 0,3/w |

FIG. 36

SUITABLE FIELD DELAY (6→5→4)

| SUITABLE FIELD DELAY | THROUGH | MEMORY | | | | ACTUAL FIELD DELAY | RELATIVE NUMBER OF READ MEMORY AND TYPE OF WRITING |
|---|---|---|---|---|---|---|---|
| | | A | B | C(=x) | D | | |
| 6 | [6] | (0) | 2 | 4 | −2/6 | 6 | 0,3/w |
| 6 | 7 | (0) | 2 | 4 | [6] | 6 | 1,4/n |
| 6 | [8] | 0/8 | (2) | 4 | 6 | 6 | 0,3/w |
| 6 | 9 | [8] | (2) | 4 | 6 | 6 | 1,4/n |
| 5 | [10] | 8 | 2/10 | (4) | 6 | 6 | 0,x/w |
| 5 | [11] | 8 | 10 | 4/11 | (6) | 5 | 0,3/x |
| 5 | 12 | 8 | 10 | [11] | (6)/12 | 5 | x,3/w |
| 5 | [13] | (8) | 10 | 11/13 | 12 | 5 | 0,3/x |
| 4 | [14] | 8/14 | (10) | 13 | 12 | 4 | 0,2/w |
| 4 | 15 | [14] | (10) | 13/15 | 12 | 4 | 1,3/x |
| 4 | [16] | 14 | 10/16 | 13 | (12) | 4 | 0,2/w |
| 4 | 17 | 14 | [16] | 13/15 | (12) | 4 | 1,3/x |

FIG. 37

SUITABLE FIELD DELAY (6→5→4)

| SUITABLE FIELD DELAY | THROUGH | MEMORY | | | | ACTUAL FIELD DELAY | RELATIVE NUMBER OF READ MEMORY AND TYPE OF WRITING |
|---|---|---|---|---|---|---|---|
| | | A | B(=x) | C | D | | |
| 6 | [6] | (0) | 2 | 4 | −2/6 | 6 | 0,3/w |
| 6 | 7 | (0) | 2 | 4 | [6] | 6 | 1,4/n |
| 6 | [8] | 0/8 | (2) | 4 | 6 | 6 | 0,3/w |
| 5 | [9] | 8 | 2/9 | (4) | 6 | 5 | 0,3/x |
| 5 | 10 | 8 | [9] | (4)/10 | 6 | 5 | x,3/w |
| 5 | [11] | 8 | 9/11 | 10 | (6) | 5 | 0,3/x |
| 5 | 12 | 8 | [11] | 10 | (6)/12 | 5 | x,3/w |
| 4 | 13 | (8) | 11/13 | 10 | [12] | 4 | 1,3/x |
| 4 | [14] | 8/14 | 13 | (10) | 12 | 4 | 0,2/w |
| 4 | 15 | [14] | 13/15 | (10) | 12 | 4 | 1,3/x |
| 4 | [16] | 14 | 15 | 10/16 | (12) | 4 | 0,2/w |
| 4 | 17 | 14 | 15/17 | [16] | (12) | 4 | 1,3/x |

FIG. 38

SUITABLE FIELD DELAY (4→5→6)

| SUITABLE FIELD DELAY | THROUGH | MEMORY | | | | ACTUAL FIELD DELAY | RELATIVE NUMBER OF READ MEMORY AND TYPE OF WRITING |
|---|---|---|---|---|---|---|---|
| | | A | B | C | D(=x) | | |
| 4 | [6] | 0/6 | (2) | 4 | 5 | 4 | 0,2/w |
| 4 | 7 | [6] | (2) | 4 | 5/7 | 4 | 1,3/x |
| 4 | [8] | 6 | 2/8 | (4) | 7 | 4 | 0,2/w |
| 5 | [9] | 6 | 8 | (4) | 7/9 | 5 | 0,3/x |
| 5 | 10 | 6 | 8 | (4)/10 | [9] | 5 | x,3/w |
| 5 | [11] | (6) | 8 | 10 | 9/11 | 5 | 0,3/x |
| 6 | 12 | (6)/12 | 8 | 10 | [11] | 5 | x,3/w |
| 6 | [13] | 12 | (8) | 10 | 11/13 | 5 | 0,3/x |
| 6 | 14 | 12 | (8)/14 | 10 | [13] | 5 | x,3/w |
| 6 | [15] | 12 | 14 | (10) | 13/15 | 5 | 0,3/x |
| 6 | 16 | 12 | 14 | (10)/16 | [15] | 5 | x,3/w |
| 6 | [17] | (12) | 14 | 16 | 15/17 | 5 | 0,3/x |
| 6 | [18] | (12) | 14 | 16 | 17/18 | 6 | 0,3/w |
| 6 | 19 | (12) | 14 | 16 | [18] | 6 | 1,4/n |
| 6 | [20] | 12/20 | (14) | 16 | 18 | 6 | 0,3/w |
| 6 | 21 | [20] | (14) | 16 | 18 | 6 | 1,4/n |
| 6 | [22] | 20 | 14/22 | (16) | 18 | 6 | 0,3/w |

METHOD OF CONVERTING TWO-DIMENSIONAL IMAGES INTO THREE-DIMENSIONAL IMAGES

BACKGROUND OF THE INVENTION

1. Field of the Invention

The present invention relates to a method of converting two-dimensional (2D) images outputted from a VTR (Video Tape Recorder), a video camera or the like and transmitted by a CATV (Cable Television), TV broadcasting or the like into three-dimensional (3D) images.

2. Description of the Prior Art

Almost all types of 3D image software used for a 3D image display system which has been recently in the news are particularly produced for the 3D image display system. The 3D image software is generally recorded by picking up a left eye image and a right eye image using two cameras. The left eye image and the right eye image which are recorded on the 3D image software are displayed with they being overlapped with each other on a display device almost simultaneously. The left eye image and the right eye image which are displayed with they being overlapped with each other are separately incident on the left eye and the right eye of a viewer, respectively, whereby the viewer recognizes 3D images.

A lot of types of 2D image software currently exist. If a 3D image can be produced from the 2D image software, therefore, time and labor required to produce 3D image software having the same content as that of the existing 2D image software again from the beginning are saved.

As a result, a method of converting 2D images into 3D images has already been proposed. Examples of the conventional method of converting 2D images into 3D images include the following. Specifically, in the case of a 2D image on which an object moving from the left to the right is reflected, the original 2D image is taken as a left eye image, and an image corresponding to a field which is several fields preceding a field corresponding to the left eye image is taken as a right eye image. Consequently, binocular parallax occurs between the left eye image and the right eye image. By displaying both the images on a screen almost simultaneously, therefore, the moving object is raised forward against the background.

The image corresponding to the field which is several fields preceding the field corresponding to the left eye image is obtained by storing the original 2D image in a field memory, delaying the image by a predetermined number of fields and reading out the image. The above-mentioned conventional method is referred to as a field delay system.

In the conventional method, when the number of fields from the field corresponding to one of the left eye image and the right eye image to the field corresponding to the other image (hereinafter referred to as a field delay) is made constant, the faster the movement of the moving object is, the larger the parallax becomes. Therefore, a 3D effect is changed so that a 3D image is difficult to see.

Therefore, the applicant of the present invention has conceived that the faster the movement of a moving object becomes, the smaller a field delay from one of a left eye image and a right eye image to the other image is made in order to obtain a stable 3D effect. Consequently, a relatively new field is presented as a delayed image with respect to an image whose movement is fast, and a relatively old field is presented as a delayed image with respect to an image whose movement is slow.

When the field delay from one of the left eye image and the right eye image to the other image is thus changed, field memories whose number corresponds to the maximum field delay from one of the left eye image and the right eye image to the other image are required.

SUMMARY OF THE INVENTION

An object of the present invention is to provide a method of converting 2D images into 3D images, in which the number of field memories can be reduced in a case where a field delay from one of a left eye image and a right eye image to the other image is changed.

In a first method of converting 2D images into 3D images according to the present invention, when the movement of a main image is fast, the main image is written into field memories for each field. When the movement of the main image is slow, the main image is written into the field memories at intervals of a predetermined number of fields. An image to be read out as a sub-image from the field memories is determined on the basis of the speed of the movement of the main image.

When the movement of the main image is slow, the main image is written into the field memories at intervals of one field, for example.

The suitable field delay from the main image to the sub-image may be calculated on the basis of the speed of the movement of the main image, and the speed of the movement of the main image may be judged on the basis of the calculated field delay.

The field delay from the main image to the sub-image is so determined that the slower the movement of the main image is, the larger the field delay is.

Since the field delay from the main image to the sub-image is so determined that the slower the movement of the main image is, the larger the field delay is. Therefore, the maximum field delay is determined by a field delay in a case where the movement of the main image is slow. In the first method of converting 2D images into 3D images according to the present invention, when the movement of the main image is slow, the main image is written into the field memories at intervals of a predetermined number of fields, whereby the number of field memories can be made smaller than the maximum field delay.

In a second method of converting 2D images into 3D images according to the present invention, when the movement of a 2D input image is fast, the 2D input image is written into field memories for each field. When the movement of the 2D input image is slow, the 2D input image is written into the field memories at intervals of a predetermined number of fields. A main image is selected out of the 2D input image and images in the field memories and a sub-image is selected out of the images in the field memories so that a field delay from the main image to the sub-image becomes a value determined on the basis of the speed of the movement of the 2D input image.

In a third method of converting 2D images into 3D images according to the present invention, when the movement of a 2D input image is fast, the 2D input image is written into field memories for each field. When the movement of the 2D input image is slow, the 2D input image is written into the field memories excluding one field memory at intervals of a predetermined number of fields, and a 2D input image of a field which is not written into the other field memories is written into the excluded one field memory. A main image is selected out of the 2D input image and images in the field memories and a sub-image is selected out of the images in the field memories so that a field delay from the main image to the sub-image becomes a value determined on the basis of the speed of the movement of the 2D input image.

In a fourth method of converting 2D images into 3D images according to the present invention, when the movement of a 2D input image is fast, the 2D input image is written into field memories for each field. When the movement of the 2D input image is slow, processing in the write mode conforming to the speed of the movement of the 2D input image out of the first write mode in which the 2D input image is written into field memories at intervals of a predetermined number of fields and the second write mode in which the 2D input image is written into the field memories excluding one field memory at intervals of a predetermined number of fields and an 2D input image of a field which is not written into the other field memories is written into the excluded one field memory is performed. The main image is selected out of the 2D input image and images in the field memories and the sub-image is selected out of the images in the field memories so that the field delay from the main image to the sub-image becomes a value determined on the basis of the speed of the movement of the 2D input image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a timing chart showing how the target field delay is changed in a case where all three second field delays coincide;

FIG. 7 is a timing chart showing how the target field delay is changed in a case where all three second field delays are larger than the current target field delay;

FIG. 8 is an explanatory view for explaining a first embodiment of a method of controlling field memories;

FIG. 9 is an explanatory view for explaining a first embodiment of a method of controlling field memories;

FIG. 11 is a timing chart showing a specific example of field memory control in a case where the suitable field delay is 1;

FIG. 12 is a timing chart showing a specific example of field memory control in a case where the suitable field delay is 2;

FIG. 13 is a timing chart showing a specific example of field memory control in a case where the suitable field delay is 3;

FIG. 14 is a timing chart showing a specific example of field memory control in a case where the suitable field delay is 4;

FIG. 15 is a timing chart showing a specific example of field memory control in a case where the suitable field delay is 5;

FIG. 16 is a timing chart showing a specific example of field memory control in a case where the suitable field delay is 6;

FIG. 17 is a timing chart showing a specific example of field memory control in a case where the suitable field delay changes from 0 to 3 through 1 and 2;

FIG. 18 is a timing chart showing a specific example of field memory control in a case where the suitable field delay changes from 3 to 0 through 2 and 1;

FIG. 19 is a timing chart showing a specific example of field memory control in a case where the suitable field delay changes from 4 to 6 through 5;

FIG. 20 is a timing chart showing a specific example of field memory control in a case where the suitable field delay changes from 6 to 4 through 5;

FIG. 21 is a timing chart showing a specific example of field memory control in a case where the suitable field delay changes from 3 to 4;

FIG. 22 is a timing chart showing a specific example of field memory control in a case where the suitable field delay changes from 4 to 3;

FIG. 23 is a timing chart showing a specific example of field memory control in a case where the suitable field delay changes from 4 to 3;

FIG. 24 is an explanatory view for explaining the normal method of controlling field memories;

FIG. 27 is a timing chart showing a specific example of a field memory control in a case where the suitable field delay is 1;

FIG. 28 is a timing chart showing a specific example of field memory control in a case where the suitable field delay is 2;

FIG. 29 is a timing chart showing a specific example of field memory control in a case where the suitable field delay is 3;

FIG. 30 is a timing chart showing a specific example of field memory control in a case where the suitable field delay is 4;

FIG. 31 is a timing chart showing a specific example of field memory control in a case where the suitable field delay is 5;

FIG. 32 is a timing chart showing a specific example of field memory control in a case where the suitable field delay is 6;

FIG. 33 is a timing chart showing a specific example of field memory control in a case where the suitable field delay changes from 3 to 3 through 4;

FIG. 34 is a timing chart showing a specific example of field memory control in a case where the suitable field delay changes from 4 to 3;

FIG. 35 is a timing chart showing a specific example of field memory control in a case where the suitable field delay changes from 4 to 3;

FIG. 36 is a timing chart showing a specific example of field memory control in a case where the suitable field delay changes from 6 to 4 through 5;

FIG. 37 is a timing chart showing a specific example of field memory control in a case where the suitable field delay changes from 6 to 4 through 5; and FIG. 38 is a timing chart showing a specific example of field memory control in a case where the suitable field delay changes from 4 to 6 through 5.

DETAILED DESCRIPTION OF THE PREFERRED EMBODIMENTS

Description is now made of embodiments of the present invention with reference to the drawings.

Figure 1:
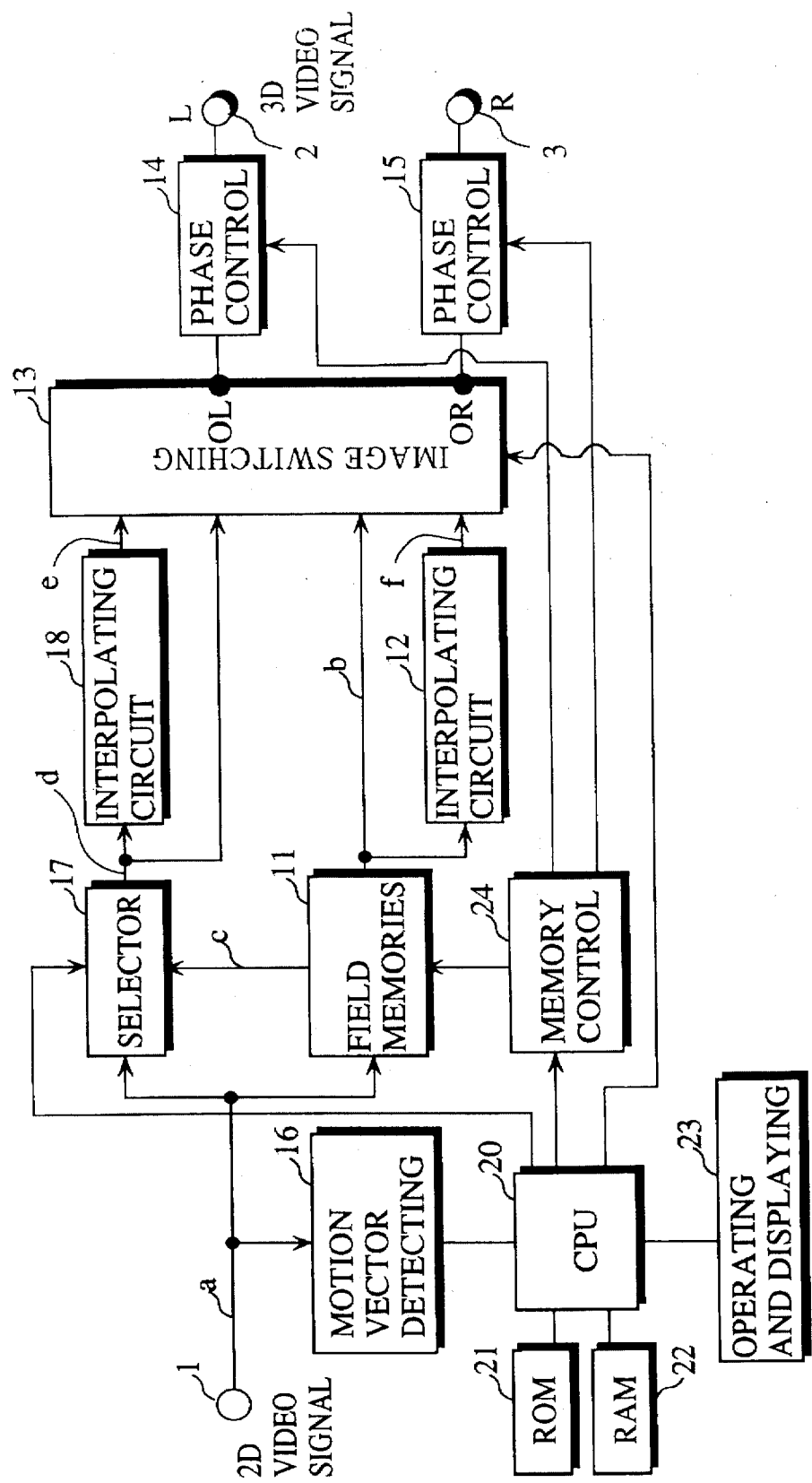
FIG. 1 is a block diagram showing the construction of a 2D/3D converter.

FIG. 1 illustrates the construction of a 2D/3D converter for converting 2D images into 3D images.

The 2D/3D converter produces a left eye image and a right eye image by a field delay system to produce parallax, and subjects both or one of the left eye image and the right eye image which are produced to phase shift, thereby to change the positional relationship between a subject and the surface of a reference screen.

A 2D image signal (a 2D video signal) a is inputted to an input terminal 1. The input image signal a is sent to a motion vector detecting circuit 16, a plurality of field memories 11, and a selector 17.

As is well known, the motion vector detecting circuit 16 produces data for detecting a motion vector on the basis of a representative point matching method. The data produced by the motion vector detecting circuit 16 is sent to a CPU (Central Processing Unit) 20.

The representative point matching method will be briefly described. A plurality of motion vector detecting areas are set in an image area of each of fields, and each of the motion vector detecting areas is divided into a plurality of small areas. A plurality of sampling points and one representative point are set in each of the small areas.

The difference between the level of an image signal at a sampling point in each of the small areas in the current field and the level of an image signal at a representative point in a corresponding small area in the preceding field (a correlation value at each of the sampling points) is found for each motion vector detecting area. Correlation values at the sampling points which are the same in displacement from the representative points are accumulated between the small areas in each of the motion vector detecting areas. In each of the motion vector detecting areas, displacement of a point at which the minimum accumulated correlation value is obtained, that is, displacement of a point at which the correlation characteristics are the highest is extracted as a motion vector in the motion vector detecting area (the movement of a subject).

The field memory 11 is provided in order to delay the input image signal a for each field and output the delayed input image signal a. A plurality of field memories 11 are provided. Writing and reading to and from each of the field memories 11 are controlled by a memory control circuit 24.

Every time a field of the input image signal a is switched, a 2D image signal in any one of the field memories 11 is outputted as a sub-image signal b. In a second embodiment of field memory control data producing processing as described later, the 2D image signal in any one of the field memories 11 may, in some cases, be selected as a main image signal d. In this case, an image signal c to be selected as the main image signal d is read out from the field memory 11.

The signal c outputted from the field memory 11 is sent to the selector 17. The selector 17 selects one of the input image signal a and the image signal c, and sends the selected image signal as the main image signal d to an interpolating circuit 18 and an image switching circuit 13. The interpolating circuit 18 generates a vertical interpolation signal with respect to the input signal d (a or c). An output e of the interpolating circuit 18 (a vertical interpolation signal of the signal d) is sent to the image switching circuit 13. The switching of images by the selector 17 is controlled by a CPU (Central Processing Unit) 20.

The sub-image signal b outputted from the field memory 11 is sent to the image switching circuit 13 and an interpolating circuit 12. The interpolating circuit 12 Generates a vertical interpolation signal with respect to the input signal b. An output f of the interpolating circuit 12 (a vertical interpolation signal of the signal b) is sent to the image switching circuit 13.

Consequently, the signals d, e, b and f are inputted to the image switching circuit 13. The image switching circuit 13 switches one of the signal d and the signal e (the main image signal) and one of the signal b and the signal f (the sub-image signal) depending on the direction of the movement of the subject and outputs the signals to a left image phase control circuit 14 and a right image phase control circuit 15. When a field delay indicating how many fields are there from a field of the main image signal to a field of the sub-image signal is zero, the input image signal a is sent to both the left image phase control circuit 14 and the right image phase control circuit 15.

One of the signal d and the signal e is selected depending on whether the input image signal a corresponds to an odd field or an even field. That is, the signal, which corresponds to the type of field (an odd field or an even field) of the input image signal a, out of the signal d and the signal E is selected. More specifically, if the field of the input image signal a and the field of the signal d are of the same type (an odd field or an even field), the signal e is selected. On the other hand, if the field of the 2D image signal a and the field of the signal d are of different types, the signal e is selected. Similarly, the signal, which corresponds to the type of field (an odd field or an even field) of the input image signal a, out of the signal b and the signal f is selected. The switching of the image by the image switching circuit 13 is controlled by the CPU 20.

Each of the phase control circuits 14 and 15 is provided to horizontally move the position where an inputted image is displayed by shifting the phase of the inputted image signal. The amount and the direction of phase shift are controlled by the memory control circuit 24. An output of the left image phase control circuit 14 is sent to a left image output terminal 2. On the other hand, an output of the right image phase control circuit 15 is sent to a right image output terminal 3.

The CPU 20 controls the selector 17, the memory control circuit 24 and the image switching circuit 13. The CPU 20 comprises a ROM (Read-Only Memory) 21 for storing its program and the like and a RAM (Random Access Memory) 22 for storing necessary data. Data required to detect a motion vector is sent to the CPU 20 from the motion vector detecting circuit 16. In addition, an operating and displaying unit 23 comprising various types of inputting means and display devices is connected to the CPU 20.

The CPU 20 calculates a field delay on the basis of the motion vector. The field delay indicates how many fields are there from a field corresponding to a main image to a field corresponding to a sub-image. In principle, the field delay is so determined that it is smaller when the motion vector is large, while being larger when the motion vector is small.

Furthermore, the CPU 20 controls the image switching circuit 13 on the basis of the direction of the motion vector. Specifically, when the motion vector is directed from the left to the right, the main image signal (the signal d or e) and the sub-image signal (the signal b or f) are respectively sent to the left image phase control circuit 14 and the right image phase control circuit 15. When the motion vector is directed from the right to the left, the main image signal (the signal d or e) and the sub-image signal (the signal b or f) are respectively sent to the right image phase control circuit 15 and the left image phase control circuit 14.

In the 2D/3D converter, the main image and the sub-image are produced to produce parallax by the field delay system, and both or one of the main image and the sub-image which are produced are subjected to phase shift, to change the positional relationship between the subject and the surface of a reference screen.

Figure 2:
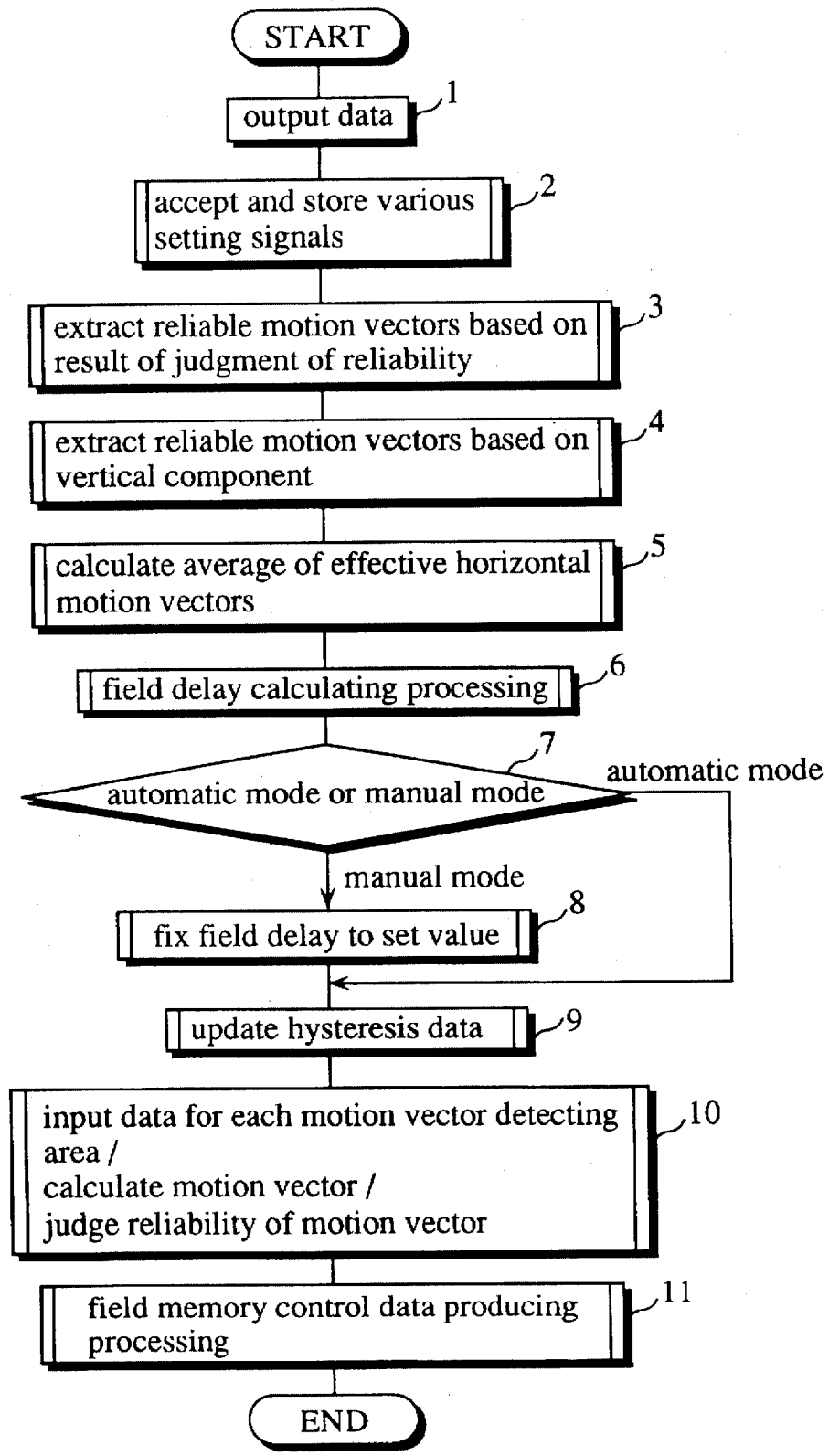
FIG. 2 is a flow chart showing the entire procedure for 2D/3D converting processing by a CPU.

FIG. 2 shows the procedure for 2D/3D converting processing by the CPU.

The 2D/3D converting processing by the CPU is performed for each timing of switching of the field of the input image signal a.

(1) In the step 1, data indicating whether or not an image signal a corresponding to one field which is inputted this time is written, data representing a field memory to which a 2D image signal should be written (a write memory) when writing is performed, and data representing a field memory from which a 2D image signal should be read out (a read memory) are outputted to the memory control circuit 24. The data are produced by field memory control data producing processing in the step 11 in the previous 2D/3D converting processing.

In the step 1, data representing the amount and the direction of phase shift by each of the phase control circuits 14 and 15 is further outputted to the memory control circuit 24. Further, an image switching control signal is outputted to the image switching circuit 13. The amount and the direction of phase shift by each of the phase control circuits 14 and 15 are determined on the basis of data which have already been accepted and stored in the step 2 in the previous 2D/3D converting processing.

The selection of one of the signals a and c (the selection of the main image) by the selector 17 is determined on the basis of data obtained by field memory control data producing processing as described later. In the first embodiment of the field memory control data producing processing, the input image signal a is always selected as the main image signal d. The selection of one of the signals d and e is determined on the basis of the type of field of the signal d and the type of field of the input image signal a. Similarly, the selection of one of the signals b and f is determined on the basis of the type of field of the signal b and the type of field of the input image signal a.

Furthermore, the switching between the selected main image signal (d or e) and the selected sub-image signal (b or f) is determined on the basis of the direction of a motion vector in the horizontal direction which is found by the previous 2D/3D converting processing. The direction of the switching between the main image signal (d or e) and the sub-image signal (b or f) is represented by the plus or minus sign of the field delay.

(2) In the step 2, various input signals from the operating and displaying unit 23 are accepted and stored. Examples of the various input signals include a signal for setting the amount and the direction of phase shift, an automatic/manual mode setting signal indicating which of the automatic mode and the manual mode is set to calculate a field delay, a field delay scale factor setting signal set in a case where the automatic mode is set, and a field delay setting signal set in a case where the manual mode is set.

(3) In the step 3, only reliable motion vectors are extracted on the basis of the result of judgment of reliability with respect to motion vectors for each motion vector detecting area which is found in the step 10 in the previous 2D/3D converting processing.

(4) In the step 4, only motion vectors the vertical components of which are smaller than a predetermined value out of the reliable motion vectors which are extracted in the step 3 are extracted.

(5) In the step 5, the average value of the horizontal components of the reliable motion vectors which are extracted in the step 4 (effective horizontal motion vectors) is calculated.

(6) In the step 6, field delay calculating processing based on the average value of the effective horizontal motion vectors which is calculated in the step 5 is performed. The details of the field delay calculating processing will be described later.

(7) In the step 7, it is judged which of the automatic mode and the manual mode is set on the basis of the data accepted and stored in the step 2.

(8) When it is judged in the step 7 that the manual mode is set, the field delay is fixed to the set value which is accepted in the step 2 (step 8).

(9) It is judged in the step 7 that the automatic mode is set, hysteresis data used in the field delay calculating processing in the step 6 is updated (step 9).

(10) In the step 10, data required to detect motion vectors is accepted from the motion vector detecting circuit 16, and a motion vector for each of the motion vector detecting areas is calculated. In addition, the reliability of the motion vector is judged for each motion vector detecting area on the basis of the average value and the minimum value of accumulated correlation values for the motion vector detecting area. The calculated motion vector and the result of the judgment of the reliability are stored in the RAM 22.

(11) In the step 11, the field memory control data producing processing is performed. That is, when the delay setting mode is the automatic mode, data indicating whether or not an input image signal a in the succeeding field should be written, and data representing a write memory when writing is performed and data representing a read memory are produced on the basis of the field delay calculated in the step 6. The details of the field memory control data producing processing will be described later.

Figure 3:
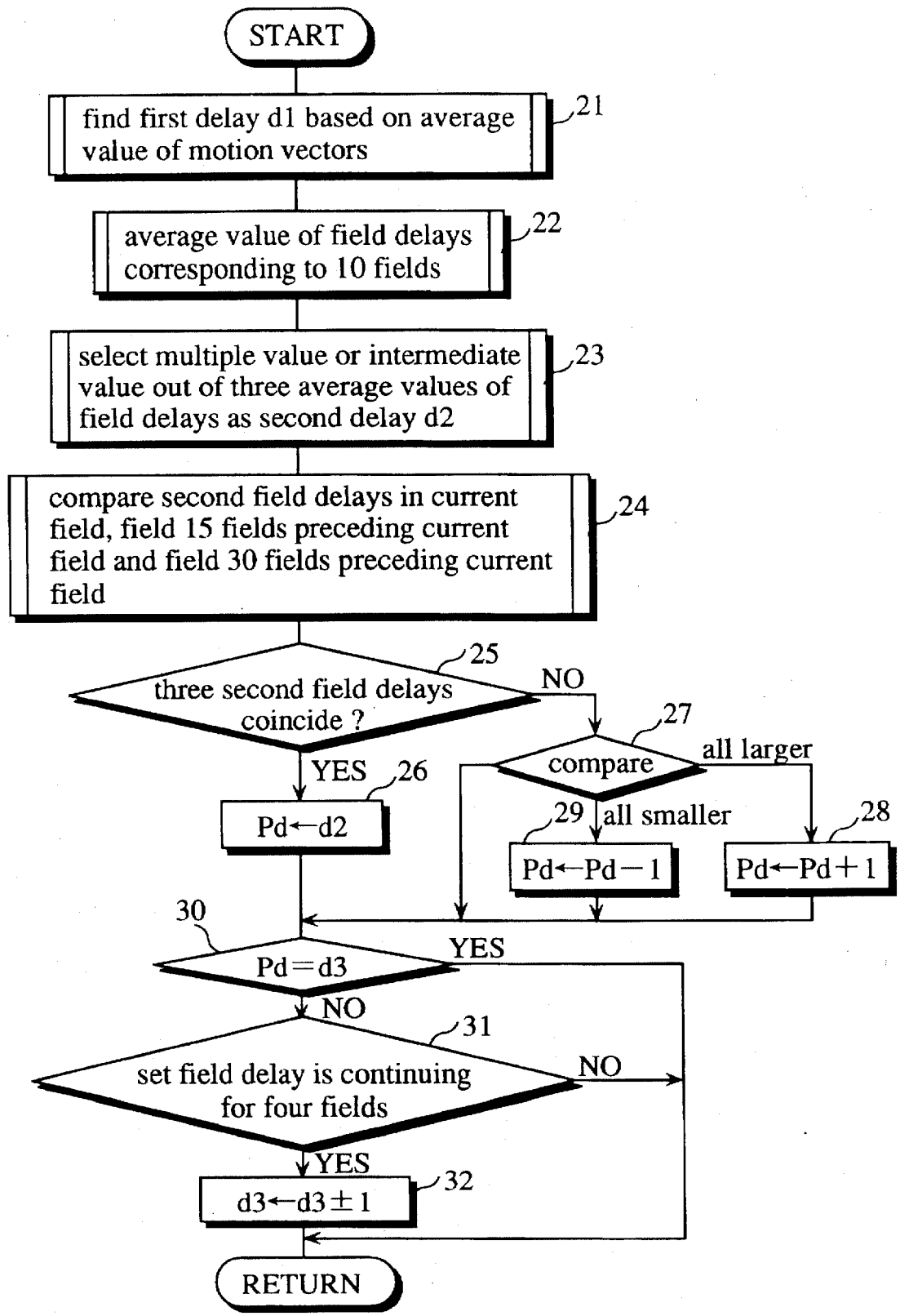
FIG. 3 is a flow chart showing the detailed procedure for field delay calculating processing in the step 6 shown in FIG. 2.

FIG. 3 shows the detailed procedure for the field delay calculating processing in the step 6 shown in FIG. 2.

A first field delay d1 is first found on the basis of the field delay scale factor setting signal which is set and stored in the foregoing step 2 and the average value v of the effective horizontal motion vectors (hereinafter referred to as the average value of motion vectors) which is found in the foregoing step 5 (step 21).

Figure 4:
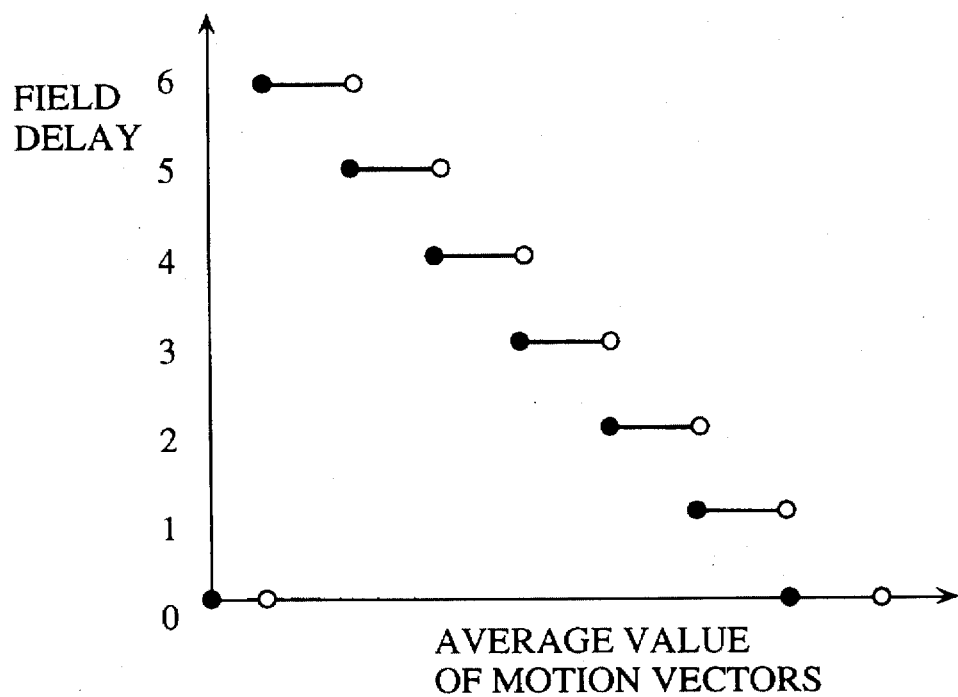
FIG. 4 is a graph showing the relationship between the average value of motion vectors and a first field delay.

FIG. 4 shows the relationship between the average value of motion vectors and a field delay. The relationship as shown in FIG. 4 is stored as a field delay table in the ROM 21. The field delay corresponding to the average value of motion vectors is found from the field delay table.

Parallax differs depending on the conditions of a 3D display device (a monitor), that is, the type of monitor and the conditions under which the monitor is seen even if the same 3D image signal (the same 3D video signal) is used. Therefore, the field delay found from the field delay table is multiplexed by the value of the field delay scale factor setting signal which is set and stored in the foregoing step 2 so as to obtain a similar 3D effect or conform to the taste of a viewer irrespective of the conditions of the monitor, thereby to find the first field delay d1.

A plurality of types of field delay tables are stored so as to obtain the same 3D effect irrespective of the conditions of the monitor, and an instruction to select a field delay table corresponding to the conditions of the monitor or the taste of the viewer may be entered from the operating and displaying unit 23.

Figure 5:
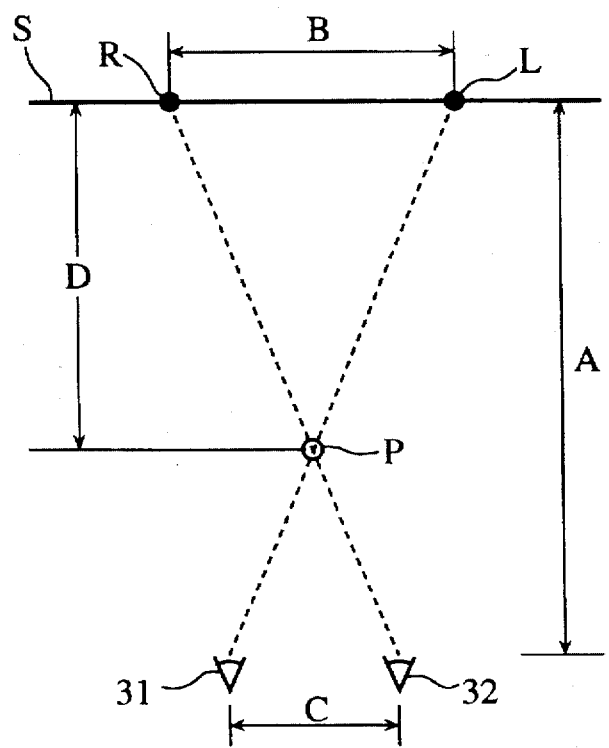
FIG. 5 is a typical diagram for explaining a method of deriving a relational expression for finding a first field delay from the average value of motion vectors.

Furthermore, the first field delay d1 may be found on the basis of not the field delay table but a predetermined relational expression. A method of finding the relational expression in this case will be described with reference to FIG. 5.

The suitable spacing between a monitor surface S and the eyes 31 and 32 of the viewer is taken as a proper viewing distance A [mm]. The spacing between a right image R and a left image L of a viewed object on the monitor surface S is taken as parallax B [mm]. The distance between the eyes is taken as C [mm]. The proper viewing distance A is determined by the conditions of the monitor. The parallax B of the viewed object differs depending on the conditions of the monitor even if the same 3D image signal is used.

The position P of a 3D image of the viewed object is determined by the proper viewing distance A, the parallax B and the distance between the eyes C. That is, an amount D [mm] by which the viewed object is raised forward against the monitor surface S is determined by the proper viewing distance A, the parallax B and the distance between the eyes C.

The parallax B for setting the amount by which the viewed object is raised forward against the monitor surface S to a predetermined amount D is represented by the following equation (1) irrespective of the conditions of the monitor:

$$B = D \cdot C/(A-) \quad (1)$$

Letting H [mm] be the horizontal length of the monitor, h [pixel] be the number of pixels in the horizontal direction of the monitor, v [pixel/field] be the average value of motion vectors, and d1 [field] be a first field delay, the following relationship holds:

$$d1 \cdot v = (h/H) \cdot B \quad (2)$$

When an amount obtained by converting the parallax B into the number of pixels (=(h/H)·B) is set to an amount of adjustment X set by the operating and displaying unit 23 (data relating to the conditions of the monitor or data conforming to the taste of the viewer), the first field delay d1 is found by the following relational expression:

$$d1 = X/v \quad (3)$$

When the first field delay d1 is found in the step 21, the average value of field delays corresponding to 10 fields from the current field to a field which is nine fields preceding the field, the average value of field delays corresponding to 10 fields from a field which is one field preceding the current field to a field which is nine fields preceding the field, and the average value of field delays corresponding to 10 fields from a field which is two fields preceding the current field to a field which is nine fields preceding the field are respectively calculated on the basis of field delay hysteresis data (step 22).

The field delay hysteresis data used in the step 22 is the first field delay d1 obtained in the step 21 in the past.

If two or more of the three average values are the same, the value (a multiple value) is selected as a second field delay d2. If all of the average values differ, an intermediate value is selected as a second field delay d2 (step 23).

Either one of the second field delay d2 selected in the step 23 and a second field delay d2 in one of fields which are 12 to 18 fields preceding the current field (for example, a field which is 15 fields preceding the current field) is compared with a second field delay d2 in a field which is 30 fields preceding the current field (step 24). Field delay hysteresis data used in the step 24 is the second field delay d2 obtained in the step 23 in the past.

When all the second field delays d2 coincide (YES in step 25), a target field delay Pd is changed into the second field delay selected in the step 23 (Pd=d2) (step 26), after which the program proceeds to the step 30. When the three second field delays d2 (which are represented by d2-1, d2-2 and d2-3 in the order from the past) are so changed that all the second field delays d2 coincide, as shown in FIG. 6, therefore, the target field delay Pd is changed into the second field delay (d2-3).

When all the second field delays d2 do not coincide (NO in the step 25), it is judged whether all the second field delays d2 are larger than the current target field delay Pd, are smaller than the current target field delay Pd, or are neither larger nor smaller than the current target field delay Pd (step 27).

When all the second field delays d2 are larger than the current target field delay Pd, one is added to the target field delay Pd (Pd=Pd+1) (step 28), after which the program proceeds to the step 30. For example, when the three second field delays d2 (which are represented by d2-1, d2-2 and d2-3 in the order from the past) are so changed that all the second field delays d2 are larger than the current target field delay Pd, as shown in FIG. 7, one is added to the target field delay Pd.

When all the second field delays d2 are smaller than the current target field delay Pd, one is subtracted from the target field delay Pd (Pd=Pd-1) (step 29), after which the program proceeds to the step 30. When all the second field delays d2 are neither larger nor smaller than the current target field delay Pd, the program proceeds to the step 30.

In the step 30, it is judged whether or not the target field delay Pd and a field delay currently actually set (a set field delay d3) coincide with each other. When the target field delay Pd and the field delay d3 currently set do not coincide with each other, it is judged whether or not the set field delay d3 has already been continuing for four fields (step 31). When the set field delay d3 has already been continuing for four fields, the set field delay d3 is changed by one in the direction in which it approaches the target field delay Pd (d3=d3±1) (step 32). The program then proceeds to the step 7 in FIG. 2.

When it is judged in the foregoing step 30 that the target field delay Pd and the set field delay d3 coincide with each other, or when it is judged in the foregoing step 31 that the set field delay d3 has not been continuing for four fields, the program proceeds to the step 7 in FIG. 2 without changing the field delay.

Specifically, in this example, the set field delay d3 is so controlled that it approaches the target field delay Pd in units of four fields and one field at a time.

When the first field delay d1 is first calculated in the step 21 after the power supply is turned on, the second field delay d2, the target field delay Pd and the set field delay d3 become equal to d1.

In the processing shown in FIG. 3, only the average value of the field delays corresponding to 10 fields from the current field to a field which is nine fields preceding the current field may be calculated and taken as the target field delay in the step 22, to omit the processing in the steps 23, 24, 25, 26, 27, 28 and 29.

Furthermore, only the average value of the field delays corresponding to 10 fields from the current field to a field which is nine fields preceding the current field may be calculated and taken as a second field delay in the step 22, to omit the processing in the step 23.

Furthermore, the second field delay found in the step 23 may be taken as the target field delay, to omit the processing in the steps 24, 25, 26, 27, 28 and 29.

Additionally, the processing in the steps 22 and 23 may be omitted. In this case, the first field delay d1 found in the step 21 is used as the second field delay used in the step 24.

Referring now to FIGS. 8 to 24, description is made of a first embodiment of the field memory control data producing processing in the step 11 shown in FIG. 2. In the first embodiment, the input image signal a is always selected as the main image signal d.

In the first embodiment, a relatively new field is presented as a delayed image with respect to an image whose movement is fast, and a relatively old field is presented as a delayed image with respect to an image whose movement is slow. Therefore, a field delay with respect to the image whose movement is fast is decreased, and a field delay with respect to the image whose movement is slow is increased.

Consider a case where the maximum field delay is, for example, 6. In this case, when the inputted 2D image signal a of each of fields is successively written into the field memories 11, six field memories are required. Control of the writing into the field memories in this case is carried out, as shown in FIG. 24.

In FIG. 24, a numeral in the lower column which corresponds to "through" in the upper column indicates the number of the current field outputted as an image signal for one eye. Symbols A to F in the upper column respectively indicate field memories. Numerals in the lower column which correspond to the symbols A to F indicate the numbers of the fields written into the field memories A to F. In addition, a portion described in the form of a/b such as 1/7 indicates that the content of the field memory is rewritten from an image assigned a field number a to an image assigned a field number b. In the writing control shown in FIG. 24, the input image signal a is successively written into the field memories A to F.

In the present embodiment, a control method of field memories with respect to the image whose movement is slow is devised, to reduce the number of field memories. In the image whose movement is slow, the distance at which the subject moves between the adjacent fields is small. Even when the fields are thinned to display the image, therefore, it is considered that a viewer does not have a very uncomfortable feeling for his or her eyes. On the other hand, in the image whose movement is fast, the distance at which the subject moves between the adjacent fields is large. When the fields are thinned to display the image, therefore, the viewer has an uncomfortable feeling.

The input image signal is written into the field memories 11 without thinning the fields with respect to the image whose movement is fast, and the input image signal is written into the field memories 11 by thinning the fields with respect to the image whose movement is slow, to reduce the number of field memories. Description is now made of an example in which the number of field memories is reduced from six to three.

The rule for writing into the field memories 11 in this case is as follows:

(a) The input image signal a is written into the field memories for each field when the suitable field delay (the set field delay d3 determined in the step 6 shown in FIG. 2) is small (for example, 0,+1 to +3 or −1 to 1−3), while being written into the field memories once per two fields when the suitable field delay is large (for example, +4 to +6 or −4 to −6).

(b) When the suitable field delay changes from +3 to +4 or from −3 to −4, the input image signal a is not written into the field memories at a change point of the values of the suitable field delay.

(c) When the suitable field delay changes from +4 to +3 or from −4 to −3, the input image signal a is written into the field memories at a change point of the values of the suitable field delay.

Control of the writing into the field memories which conforms to the foregoing rule (a) is as shown in FIGS. 8 and 9.

FIG. 8 shows an example of control of the writing into the field memories in a case where the suitable field delay is small (+1 to +3 or −1 to −3), and FIG. 9 shows an example of control of the writing into the field memories in a case where the suitable field delay is large (+4 to +6 or −4 to −6).

As can be seen from FIG. 8, when the suitable field delay is small, that is, the movement of the image is relatively fast, the input image signal a (a through image) is successively written into the field memories A, B and C in this order.

As can be seen from FIG. 9, when the suitable field delay is large, that is, the movement of the image is relatively slow, the input image signal a (a through image) is successively written into the field memories A, B and C in this order once per two fields.

Table 1 and Table 2 show a method of selecting the sub-image signal b depending on the suitable field delay in a case where the writing control is carried out in accordance with the foregoing rule for writing.

TABLE 1

| suitable field delay | ±1 | ±2 | ±3 |
|---|---|---|---|
| relative number of read memory | 1 | 2 | 3 |
| actual field delay | 1 | 2 | 3 |

TABLE 2

| suitable field delay | ±4 | ±5 | ±6 |
|---|---|---|---|
| relative number of read memory | 2 | 2 or 3 | 3 |
| actual field delay | 3 or 4 | 4 or 5 | 5 or 6 |

Table 1 shows a method of selecting the sub-image signal b in a case where the suitable field delay is small (+1 to +3 or −1 to −3), and Table 2 shows a method of selecting the sub-image signal b in a case where the suitable field delay is large (+4 to +6 or −4 to −6).

In Table 1 and Table 2, "relative number of read memory" is data indicating how many times an image signal to be read out as the sub-image signal b is written into the field memories before a time point where an image signal of the succeeding field is inputted. When the "relative number of read memory" is, for example, 2, an image signal written twice before a time point where an image signal of the succeeding field is inputted is read out as the sub-image signal b. When the "relative number of read memory" is zero, this means that the input image signal a is used as the sub-image signal b.

As can be seen from Table 1, when the suitable field delay is small, the "relative number of read memory" becomes equal to the suitable field delay. The actual field delay also becomes equal to the suitable field delay.

As can be seen from Table 2, when the suitable field delay is large, the "relative number of read memory" becomes 2, 2 or 3, and 3, respectively, when the suitable field delay is 4, 5, and 6.

Furthermore, the actual field delay becomes 3 or 4, 4 or 5, and 5 or 6, respectively, when the suitable field delay is 4, 5 and 6. In a case where the suitable field delay is 5, it is determined depending on whether or not an image signal of the current field inputted this time is written into the field memory whether the "relative number of read memory" is set to 2 or 3.

Table 1 and Table 2 are summarized, to obtain the following Table 3.

TABLE 3

| suitable field delay | relative number of read memory | actual field delay |
| --- | --- | --- |
| 0 | 0 | 0 |
| 1 | 1 | 1 |
| 2 | 2 | 2 |
| 3 | 3 | 3 |
| 4 | 2 | 3 or 4 |
| 5 | 2 or 3 | 4 or 5 |
| 6 | 3 | 5 or 6 |

Figure 10:
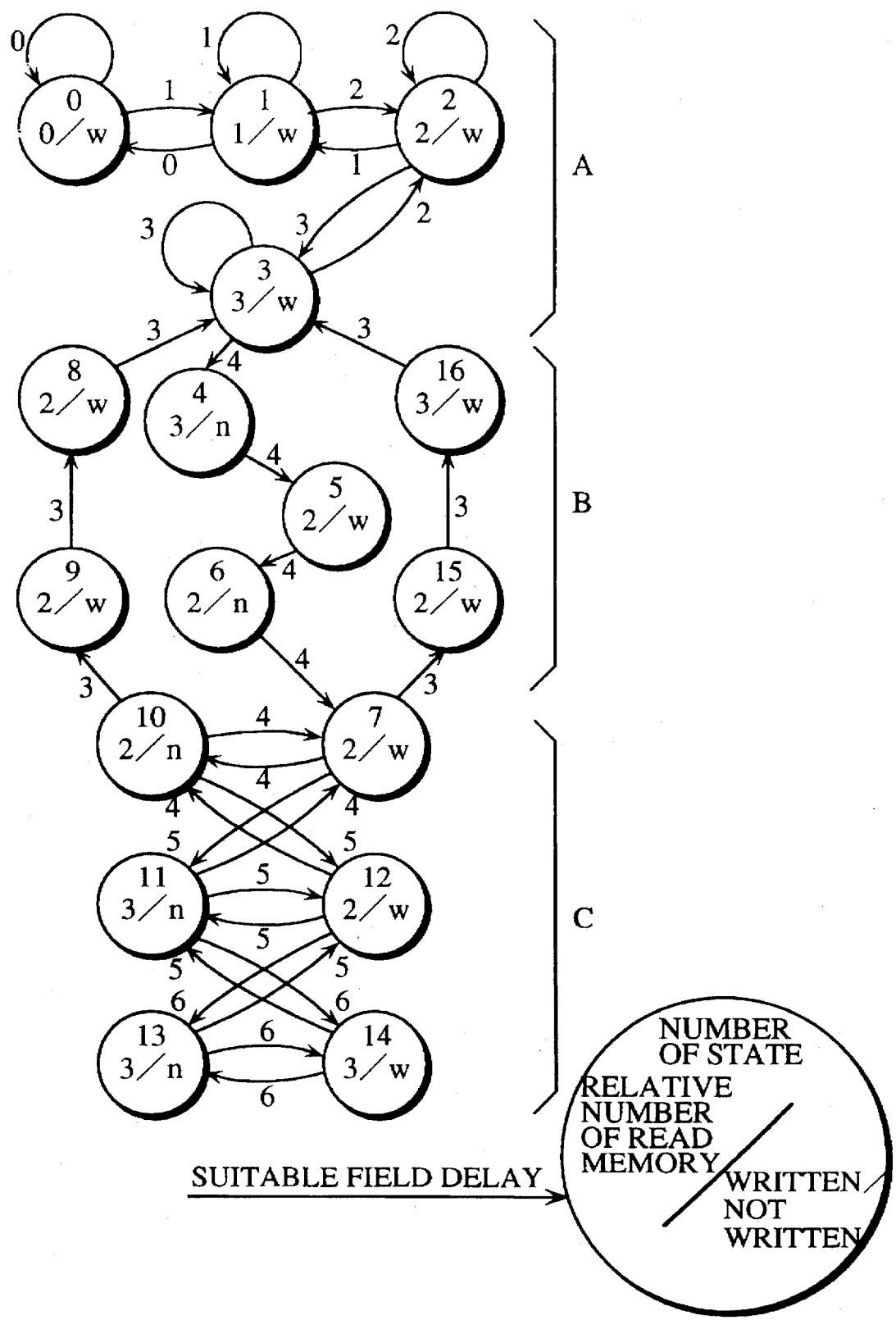
FIG. 10 is a state transition diagram for explaining a first embodiment of a method of controlling field memories.

FIG. 10 shows a state transition diagram for determining field memory control data. Data used for control of the field memories in a case where an image signal to be inputted the next time (an image signal of the succeeding field) is inputted is produced by an algorithm conforming to the state transition diagram.

Specifically, the order in which the input image signal is written to the field memories A, B and C is predetermined. Consequently, it is determined by the algorithm conforming to the state transition diagram whether or not the image signal of the succeeding field is to be written, to produce write control data (data indicating whether or not writing is performed or data representing a write memory). In addition, the "relative number of read memory" is determined by the algorithm conforming to the state transition diagram, to produce read control data for reading out the sub-image signal b (data representing a read memory).

In FIG. 10, each circle indicates a state, and numerals 0 to 16 each described in the upper stage of the circle indicate the numbers of states. In addition, a number and a symbol described in the form of β/γ such as 0/w in the circle are defined as follows:

Specifically, β denotes the "relative number of read memory" for determining a memory from which the sub-image signal b of the succeeding field is read out (a read memory), and γ indicates whether or not an input image signal of the succeeding field is to be written. A case where γ=w indicates that the input image signal of the succeeding field is written into the field memories, and a case where γ=yn indicates that the input image signal of the succeeding field is not written into the field memories.

In FIG. 10, a directed line indicates the direction of the transition between states, and a numeral attached to the directed line indicates the suitable field delay.

States 0 to 3 in an area A indicate the state transitions in a case where the suitable field delay is in the range of 0 to 3. In addition, states 7 and 10 to 14 in an area C indicate the state transitions in a case where the suitable field delay is in the range of 4 to 6.

States 4 to 6, 8, 9, 15 and 16 in an area B indicate the process of the state transitions in a case where the suitable field delay changes from 3 to 4 or in a case where the suitable field delay changes from 4 to 3.

Description is now made of the state transitions in a case where the suitable field delay does not change and a case where it changes.

(1) In a case where the suitable field delay does not change

When the suitable field delay does not change, the following state transitions occur:

The suitable field delay is 0: the state 0 is repeated.

The suitable field delay is 1: the state 1 is repeated.

The suitable field delay is 2: the state 2 is repeated.

The suitable field delay is 3: the state 3 is repeated.

The suitable field delay is 4: the states 7 and 10 are alternately repeated.

The suitable field delay is 5: the states 11 and 12 are alternately repeated.

The suitable field delay is 6: states 13 and 14 are alternately repeated.

(2) In a case where the suitable field delay changes

When the suitable field delay changes, the following state transitions occur:

The suitable field delay changes between 0 and 1: the states 0 and 1 are alternately repeated.

The suitable field delay changes between 1 and 2: the states 1 and 2 are alternately repeated.

The suitable field delay changes between 2 and 3: the states 2 and 3 are alternately repeated.

The suitable field delay changes from 3 to 4: the state 3 proceeds to the state 7 through the states 4, 5 and 6.

The suitable field delay changes from 4 to 3:

(i) The state 10 proceeds to the state 3 through the states 9 and 8, or (ii) The state 7 proceeds to the state 3 through the states 15 and 16.

The suitable field delay changes from 4 to 5:

(i) The state 7 proceeds to the state 11, or (ii) The state 10 proceeds to the state 12.

The suitable field delay changes from 5 to 4:

(i) The state 11 proceeds to the state 7, or (ii) The state 12 proceeds to the state 10.

The suitable field delay changes from 5 to 6:

(i) The state 11 proceeds to the state 14, or (ii) The state 12 proceeds to the state 13.

The suitable field delay changes from 6 to 5:

(i) The state 13 proceeds to the state 12, or (ii) The state 14 proceeds to the state 11

FIGS. 11 to 24 show specific examples of a case where field memories are controlled by the algorithm conforming to the state transition diagram of FIG. 10. In the drawings, a numeral put in parentheses indicates the number of a field selected as the sub-image signal b. In addition, a portion described in the form of a/b such as 2/6 indicates that the content of the field memory is rewritten from an image signal assigned a field number a to an image signal assigned a field number b. As each of the field memories, a field memory from which old data can be read out before new data is written or a field memory to which new data can be written while old data is read out is used.

FIG. 11 shows a specific example of a case where the suitable field delay is 1. In this case, the state 1 shown in FIG. 10 is repeated. FIG. 12 shows a specific example of a case where the suitable field delay is 2. In this case, the state 2 shown in FIG. 10 is repeated. FIG. 13 shows a specific example of a case where the suitable field delay is 3. In this case, the state 3 shown in FIG. 10 is repeated.

When the state 1, 2 or 3 continues, $\gamma=w$. Every time the field of the input image signal a is switched, therefore, the input image signal a is written into a write memory determined in a predetermined order out of the field memories A, B and C in memory control based on the step 1 in the 2D/3D converting processing (see FIG. 2). The predetermined order is A, B, C and A.

When the state 1, 2 or 3 continues, $\beta$ is 1, 2 or 3. When the suitable field delay is 1, 2 or 3, therefore, an image signal written into a field memory once, twice or three times before a time point where an image signal of the succeeding field is inputted is read out from the field memory as the sub-image signal b in the subsequent memory control (the step 1 (see FIG. 2)).

FIG. 14 shows a specific example of a case where the suitable field delay is 4. In this case, the states 7 and 10 shown in FIG. 10 are alternately repeated.

When the state 7 proceeds to the state 10, field memory control data for the succeeding field is produced in accordance with $\beta/\gamma$ in the state 10.

In the state 10, $\gamma=n$. In the subsequent memory control (step 1 (see FIG. 2)), therefore, the input image signal a is not written into a field memory. In the state 10, $\beta=2$. In the subsequent memory control, therefore, an image signal written into a field memory twice before a time point where an image signal of the succeeding field is inputted is read out from the field memory as the sub-image signal b.

When the state 10 proceeds to the state 7, field memory control data for the succeeding field is produced in accordance with $\beta/\gamma$ in the state 7.

In the state 7, $\gamma=w$. In the subsequent memory control, therefore, the input image signal a is written into a write memory determined in a predetermined order out of the field memories A, B and C. In the state 7, $\beta=2$. In the subsequent memory control, therefore, an image signal written into a field memory twice before a time point where an image signal of the succeeding field is inputted is read out from the field memory as the sub-image signal b.

FIG. 15 shows a specific example of a case where the suitable field delay is 5. In this case, the states 11 and 12 shown in FIG. 10 are alternately repeated.

When the state 11 proceeds to the state 12, field memory control data for the succeeding field is produced in accordance with $\beta/\gamma$ in the state 12.

In the state 12, $\gamma=w$ and $\beta=2$. In the subsequent memory control, therefore, the input image signal a is written into a write memory determined in a predetermined order out of the field memories A, B and C. In the subsequent memory control, an image signal written into a field memory twice before a time point where an image signal of the succeeding field is inputted is read out from the field memory as the sub-image signal b.

When the state 12 proceeds to the state 11, field memory control data for the succeeding field is produced in accordance with $\beta/\gamma$ in the state 11.

In the state 11, $\gamma=n$ and $\beta=3$. In the subsequent memory control, therefore, the input image signal a is not written into a field memory. In the subsequent memory control, an image signal written into a field memory three times before a time point where an image signal of the succeeding field is inputted is read out from the field memory as the sub-image signal b.

FIG. 16 shows a specific example of a case where the suitable field delay is 6. In this case, the states 13 and 14 shown in FIG. 10 are alternately repeated.

When the state 13 proceeds to the state 14, field memory control data for the succeeding field is produced in accordance with $\beta=3$ and $\gamma=w$ in the state 14.

When the state 14 proceeds to the state 13, field memory control data for the succeeding field is produced in accordance with $\beta=3$ and $\gamma=n$ in the state 13.

FIG. 17 shows a specific example of a case where the suitable field delay changes from 0 to 3 through 1 and 2.

When the suitable field delay changes from 0 to 1 (the through image changes from 5 to 6 in FIG. 17), the state 0 proceeds to the state 1 in FIG. 10. In this case, field memory control data for the succeeding field is produced in accordance with $\beta=1$ and $\gamma=w$ in the state 1.

When the suitable field delay changes from 1 to 2 (the through image changes from 9 to 10 in FIG. 17), the state 1 proceeds to the state 2 in FIG. 10. In this case, field memory control data for the succeeding field is produced in accordance with $\beta=2$ and $\gamma=w$ in the state 2.

When the suitable field delay changes from 2 to 3 (the through image changes from 13 to 14 in FIG. 17), the state 2 proceeds to the state 3 in FIG. 10. In this case, field memory control data for the succeeding field is produced in accordance with $\beta=3$ and $\gamma=w$ in the state 3.

FIG. 18 shows a specific example of a case where the suitable field delay changes from 3 to 0 through 2 and 1.

When the suitable field delay changes from 3 to 2 (the through image changes from 5 to 6 in FIG. 18), the state 3 proceeds to the state 2 in FIG. 10. In this case, field memory control data for the succeeding field is produced in accordance with $\beta=2$ and $\gamma=w$ in the state 2.

When the suitable field delay changes from 2 to 1 (the through image changes from 9 to 10 in FIG. 18), the state 2 proceeds to the state 1 in FIG. 10. In this case, field memory control data for the succeeding field is produced in accordance with $\beta=1$ and $\gamma=w$ in the state 1.

When the suitable field delay changes from 1 to 0 (the through image changes from 13 to 14 in FIG. 18), the state 1 proceeds to the state 0 in FIG. 10. In this case, field memory control data for the succeeding field is produced in accordance with $\beta=0$ and $\gamma=w$ in the state 0.

FIG. 19 shows a specific example of a case where the suitable field delay changes from 4 to 6 through 5.

Examples of a case where the suitable field delay changes from 4 to 5 include a case where the state 10 proceeds to the state 12 in FIG. 10 and a case where the state 7 proceeds to the state 11 in FIG. 10. In the example shown in FIG. 19 (the through image changes from 9 to 10 in FIG. 19), the state 10 proceeds to the state 12 in FIG. 10. In this case, field memory control data for the succeeding field is produced in accordance with $\beta=2$ and $\gamma=w$ in the state 12. When the state 7 proceeds to the state 11 in FIG. 10, field memory control data for the succeeding field is produced in accordance with $\beta=3$ and $\gamma=n$ in the state 11.

Examples of a case where the suitable field delay changes from 5 to 6 include a case where the state 11 proceeds to the state 14 in FIG. 10 and a case where the state 12 proceeds to the state 13 in FIG. 10. In the example shown in FIG. 19 (the through image changes from 13 to 14 in FIG. 19), the state 11 proceeds to the state 14 in FIG. 10. In this case, field memory control data for the succeeding field is produced in accordance with $\beta=3$ and $\gamma=w$ in the state 14. When the state 12 proceeds to the state 13 in FIG. 10, field memory control data for the succeeding field is produced in accordance with $\beta=3$ and $\gamma=n$ in the state 13.

FIG. 20 shows a specific example of a case where the suitable field delay changes from 6 to 4 through 5.

Examples of a case where the suitable field delay changes from 6 to 5 include a case where the state 13 proceeds to the state 12 in FIG. 10 and a case where the state 14 proceeds to the state 11 in FIG. 10. In the example shown in FIG. 20 (the through image changes from 9 to 10 in FIG. 20), the state 13 proceeds to the state 12 in FIG. 10. In this case, field memory control data for the succeeding field is produced in accordance with β=2 and γ=w in the state 12. When the state 14 proceeds to the state 11 in FIG. 10, field memory control data for the succeeding field is produced in accordance with β=3 and γ=n in the state 11.

Examples of a case where the suitable field delay changes from 5 to 4 include a case where the state 11 proceeds to the state 7 in FIG. 10 and a case where the state 12 proceeds to the state 10 in FIG. 10. In the example shown in FIG. 20 (the through image changes from 13 to 14 in FIG. 20), the state 11 proceeds to the state 7 in FIG. 10. In this case, field memory control data for the succeeding field is produced in accordance with β=2 and γ=w in the state 7. When the state 12 proceeds to the state 10 in FIG. 10, field memory control data for the succeeding field is produced in accordance with β=2 and γ=n in the state 10.

FIG. 21 shows a specific example of a case where the suitable field delay changes from 3 to 4. In this case, the state 3 proceeds to the state 7 through the states 4, 5 and 6 in FIG. 10.

When the state 3 proceeds to the state 4 (the through image changes from 6 to 7 in FIG. 21), field memory control data for the succeeding data is produced in accordance with β=3 and γ=n in the state 4. When the state 4 proceeds to the state 5 (the through image changes from 7 to 8 in FIG. 21), field memory control data for the succeeding field is produced in accordance with β=2 and γ=w in the state 5.

When the state 5 proceeds to the state 6 (the through image changes from 8 to 9 in FIG. 21), field memory control data for the succeeding field is produced in accordance with β=2 and γ=n in the state 6. When the state 6 proceeds to the state 7 (the through image changes from 9 to 10 in FIG. 21), field memory control data for the succeeding field is produced in accordance with β=2 and γ=w in the state 7.

FIG. 22 shows a specific example of a case where the suitable field delay changes from 4 to 3. FIG. 22 shows an example in which the state 10 proceeds to the state 3 through the states 9 and 8 in FIG. 10.

When the state 10 proceeds to the state 9 (the through image changes from 9 to 10 in FIG. 22), field memory control data for the succeeding field is produced in accordance with β=2 and γ=w in the state 9.

When the state 9 proceeds to the state 8 (the through image changes from 10 to 11 in FIG. 22), field memory control data for the succeeding field is produced in accordance with β=2 and γ=w in the state 8.

When the state 8 proceeds to the state 3 (the through image changes from 11 to 12 in FIG. 22), field memory control data for the succeeding field is produced in accordance with β=3 and γ=w in the state 3.

FIG. 23 shows a specific example of a case where the suitable field delay changes from 4 to 3. FIG. 23 shows an example in which the state 7 proceeds to the state 3 through the states 15 and 16 in FIG. 10.

When the state 7 proceeds to the state 15 (the through image changes from 8 to 9 in FIG. 23), field memory control data for the succeeding field is produced in accordance with β=2 and γ=w in the state 15.

When the state 15 proceeds to the state 16 (the through image changes from 9 to 10 in FIG. 23), field memory control data for the succeeding field is produced in accordance with β=3 and γ32 w in the state 16.

When the state 16 proceeds to the state 3 (the through image changes from 10 to 11 in FIG. 23), field memory control data for the succeeding field is produced in accordance with β=3 and γ=w in the state 3.

Referring now to FIGS. 25 to 38, description is made of a second embodiment of the field memory control data producing processing in the step 11 shown in FIG. 2.

In the above-mentioned first embodiment of the field memory control data producing processing, the actual field delay varies for each field in a case where the suitable field delay is ±4, ±5 or ±6 as shown in Table 3.

Figure 25:
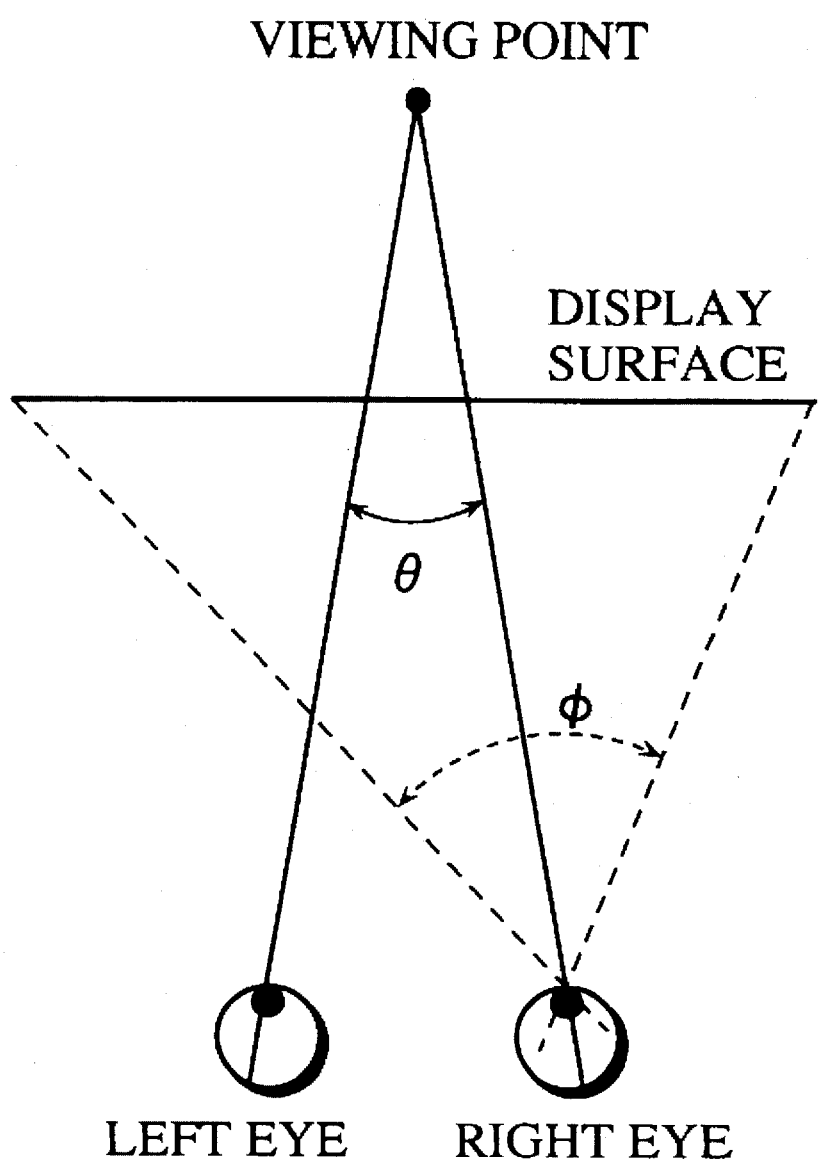
FIG. 25 is a typical diagram for explaining the problem of a second embodiment of a method of controlling field memories.

Referring to FIG. 25, in a case where a subject moving at the same speed in the horizontal direction is viewed, when the actual field delay varies for each field, a convergence angle θ regularly varies for each field. For example, it is assumed that the subject moves at the same speed in the horizontal direction, and the moving speed in this case corresponds to the suitable field delay 5. In this case, the actual field delay alternately changes to 4 or 5 for each field. A convergence angle θ in a case where the actual field delay is 4 is smaller than a convergence angle θ in a case where the actual field delay is 5. When the suitable field delay is 5, therefore, the convergence angle θ is increased or decreased for each field.

In a case where an angle of field φ of a display device to a viewer is small, the movement of the subject or a background is relatively small. Even if the field delay varies for each field, therefore, the convergence angle θ hardly varies, whereby a 3D effect is not so lost. In a case where the angle of field φ of the display device is large, however, if the field delay varies for each field, the convergence angle θ greatly varies, whereby a 3D effect may be lost.

In the second embodiment of the field memory control data producing processing, an example is illustrated in which the number of field memories is reduced to four when the maximum value of the suitable field delay is 6. In the second embodiment of the field memory control data producing processing, the actual field delay does not vary even in a case where the suitable field delay is ±4, ±5 or ±6.

Rules for writing (image saving) and reading (image display) to and from the field memories A, B, C and D are as follows:

(Rule for image saving)

(a) When the suitable field delay (the set delay d3 determined in the step 6 shown in FIG. 2) is 0,+1 to +3 or −1 to −3, the input image signal a is successively written into the four field memories in a predetermined order for each field.

(b) When the suitable field delay is +4 to +5 or −4 to −5, the input image signal a is successively written into the three field memories excluding one field memory in a predetermined order once per two fields. The input image signal a which is not written into the three field memories is successively written into the above-mentioned excluded one field memory (hereinafter referred to as an x memory).

(c) When the suitable field delay is ±6, the input image signal a is successively written into the four field memories in a predetermined order once per two fields.

(Rule for image display)

(e) An image is so selected that the actual field delay is fixed. Particularly when the suitable field delay is +4 to +5 or −4 to −5, the use of the newest saved image written into the field memory as a main image is allowed.

The relationship between the suitable field delay and the actual field delay in a case where field memory control is carried out in accordance with the above-mentioned rule is shown in Table 4. As can be seen from Table 4, the suitable field delay and the actual field delay become equal.

TABLE 4

| suitable field delay | 1 | 2 | 3 | 4 | 5 | 6 |
|---|---|---|---|---|---|---|
| actual field delay | 1 | 2 | 3 | 4 | 5 | 6 |

Figure 26:
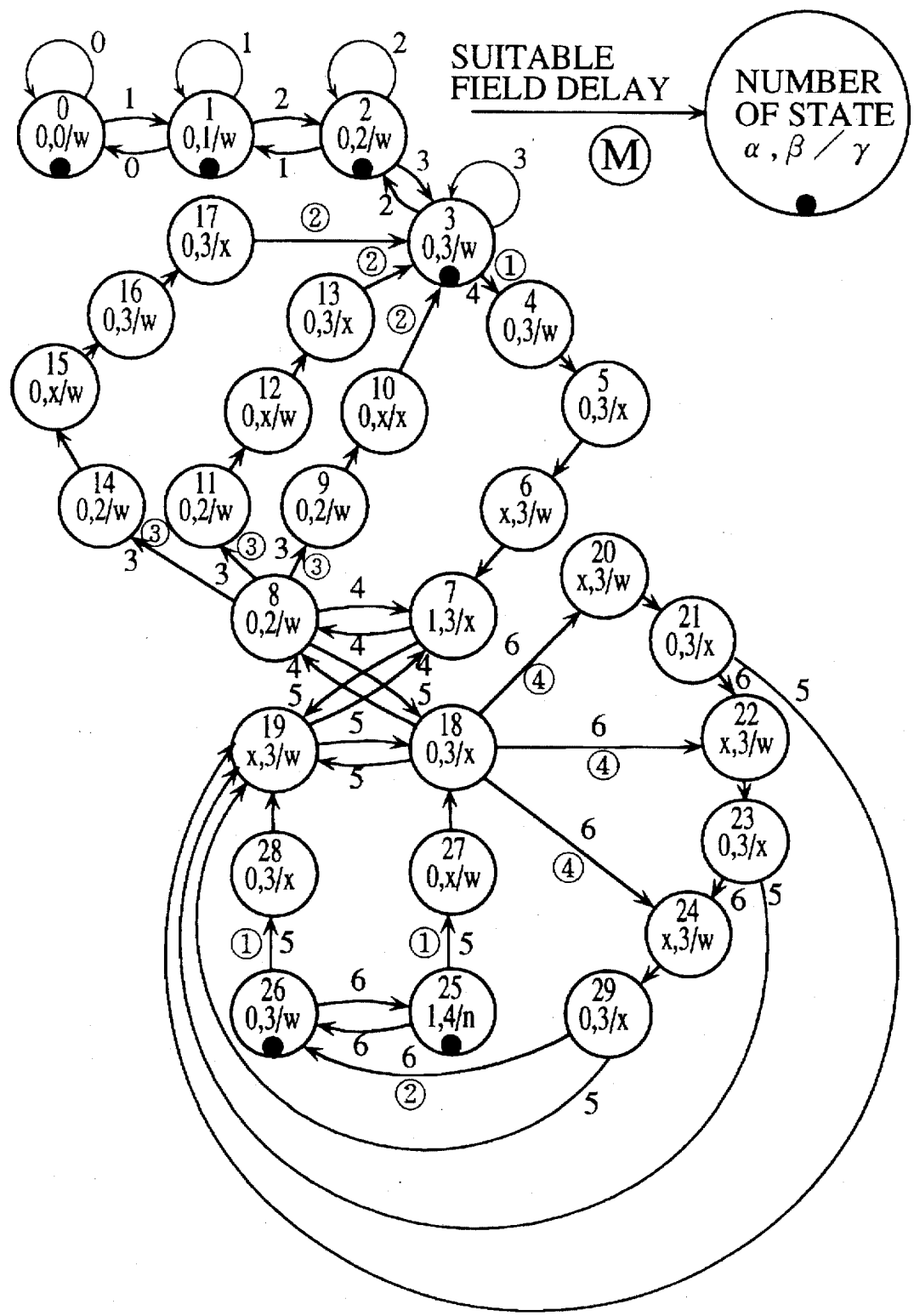
FIG. 26 is a state transition diagram for explaining a second embodiment of a method of controlling field memories.

FIG. 26 is a state transition diagram for determining field memory control data. Data used for field memory control in a case where an image signal of the succeeding field is inputted is produced by an algorithm conforming to the state transition diagram.

It is determined by the algorithm conforming to the state transition diagram whether or not the x memory is to be set in the succeeding field, which field memory is taken as the x memory when the x memory is set, whether or not the setting of the x memory is released, whether or not the input image signal of the succeeding field is to be written into a field memory, and which field memory is one into which the input image signal is to be written, to produce writing control data (data for designating the x memory, data for releasing the x memory, data indicating whether or not writing is to be performed, and data representing a write memory).

It is determined by the algorithm conforming to the state transition diagram whether or not a main image signal is to be read out from a field memory, which field memory is one from which the main image signal is to be read out, and which field memory is one from which a sub-image signal is to be read out, to produce reading control data (data representing a memory from which a main image signal is read out, or data representing a memory from which a sub-image signal is read out).

In FIG. 37, each circle indicates a state, and numerals 0 to 29 each described in the upper stage of the circle indicate the numbers of states. A black circle in a lower portion of the circle indicates a state where the x memory is not used. In addition, a number and a symbol described in the form of α, β/γ in the circle are defined as follows:

"α" denotes the relative number of a memory from which a main image signal is read out (the relative number of a main image read memory). The relative number α of the main image read memory is data indicating how many times an image signal to be read out as a main image signal is written into a field memory (excluding the x memory) before a time point where an image signal of the succeeding field is inputted.

The relative number α is 0, 1 or x in the present embodiment. A case where the relative number α is zero means that the input image signal a is selected as a main image signal in the succeeding field. A case where the relative number α is 1 means that an image signal written once before a time point where an image signal of the succeeding field is inputted is read out as a main image signal of the succeeding field. A case where the relative number α is x means that an image signal in the x memory is read out as a main image signal in the succeeding field.

"β" denotes the relative number of a memory from which a sub-image signal is read out (the relative number of a sub-image read memory). The relative number β of the sub-image read memory is data indicating how many times an image signal to be read out as a sub-image signal is written into a field memory (excluding the x memory) before a time point where an image signal of the succeeding field is inputted.

The relative number β is 0, 1, 2, 3, 4 or x in the present embodiment. A case where the relative number β is zero means that the input image signal a is selected as a sub-image signal in the succeeding field. A case where the relative number β is 1 means that an image signal written once before a time point where an image signal of the succeeding field is inputted is read out as a sub-image signal of the succeeding field.

A case where the relative number β is 2, 3 or 4 means that an image signal written twice, three times or four times before a time point where an image signal of the succeeding field is inputted is read out as a sub-image signal of the succeeding field. A case where the relative number β is x means that an image signal in the x memory is read out as a sub-image signal.

"γ" denotes data representing the type of writing. A case where γ=w means that an input image is saved in a field memory determined in accordance with a predetermined order of writing out of the field memories excluding the x memory in the succeeding field. A case where γ=x means that an input image is saved in the x memory in the succeeding field. A case where γ=n means that an input image is not saved in the succeeding field.

In FIG. 26, a directed line indicates the direction of the transition between states, and a numeral attached to the directed line indicates the suitable field delay. A directed line with a numeral enclosed with a circle indicates that the content of the processing must be supplemented. The content of the processing to be supplemented will be described later.

Description is now made of the state transitions in a case where the suitable field delay does not change and a case where it changes.

(1) In a case where the suitable field delay does not change

When the suitable field delay does not change, the following state transitions occur:

The suitable field delay is 0: the state 0 is repeated.
The suitable field delay is 1: the state 1 is repeated.
The suitable field delay is 2: the state 2 is repeated.
The suitable field delay is 3: the state 3 is repeated.
The suitable field delay is 4: the states 7 and 8 are alternately repeated.
The suitable field delay is 5: the states 18 and 19 are alternately repeated.
The suitable field delay is 6: the states 25 and 26 are alternately repeated.

(2) In a case where the suitable field delay changes

When the suitable field delay changes, the following state transitions occur:

The suitable field delay changes between 0 and 1: the states 0 and 1 are alternately repeated.
The suitable field delay changes between 1 and 2: the states 1 and 2 are alternately repeated.
The suitable field delay changes between 2 and 3: the states 2 and 3 are alternately repeated.
The suitable field delay changes from 3 to 4: the state 3 proceeds to the state 7 through the states 4, 5 and 6.
The suitable field delay changes from 4 to 3:
  (i) The state 8 proceeds to the state 3 through the states 9 and 10,
  (ii) The state 8 proceeds to the state 3 through the states 11, 12 and 13, or
  (iii) The state 8 proceeds to the state 3 through the states 14, 15, 16 and 17.
The suitable field delay changes from 4 to 5:
  (i) The state 7 proceeds to the state 19, or (ii) The state 8 proceeds to the state 18.

The suitable field delay changes from 5 to 4:
(i) The state 18 proceeds to the state 8, or
(ii) The state 19 proceeds to the state 7.

The suitable field delay changes from 5 to 6:
(i) The state 18 proceeds to the state 26 through the states 24 and 29,
(ii) The state 18 proceeds to the state 26 through the states 22, 23, 24 and 29, and
(iii) The state 18 proceeds to the state 26 through the states 20, 21, 22, 23, 24 and 29.

When the suitable field delay changes to 5 in the state 29 in the foregoing items (i), (ii) and (iii), the state 29 proceeds to the state 19. In addition, when the suitable field delay changes to 5 in the state 23, the state 23 proceeds to the state 19. Further, when the suitable field delay changes to 5 in the state 21, the state 21 proceeds to the state 19.

The suitable field delay changes from 6 to 5:
(i) The state 25 proceeds to the state 18 through the state 27, or
(ii) The state 26 proceeds to the state 19 through the state 28.

Supplementary explanation is now made of processing performed in the state transitions in a case where a numeral enclosed with a circle is attached to a directed line.

(1) Supplementary explanation of the state transition in a case where ① is attached to a directed line
 (i) The state transition from the state 3 to the state 4. A field memory which is three field memories ahead of a field memory into which an image signal will be written in the order of writing is assigned to the x memory. For example, if the field memory into which an image signal will be written is D, the field memory C is taken as the x memory (see a portion where the through image changes from 7 to 8 in FIG. 33).
 (ii) The state transition from the state 25 to the state 27: A field memory which is one field memory ahead of a field memory into which an image signal will be written in the order of writing is assigned to the x memory. For example, if the field memory into which an image signal will be written is B, the field memory C is taken as the x memory (see a portion where the through image changes from 9 to 10 in FIG. 36).
 (iii) The state transition from the state 26 to the state 28: The field memory into which an image signal will be written is assigned to the x memory, after which a field memory which is one field memory ahead of the assigned x memory in the order of writing is assigned as a field memory into which an image signal will be written. For example, if the field memory into which an image signal will be written is B, the field memory B is taken as the x memory, and the field memory C which is one field memory ahead of the x memory B in the order of writing is assigned as a field memory into which an image signal will be written (see a portion where the through image changes from 8 to 9 in FIG. 37).

(2) Supplementary explanation of the state transition in a case where ② is attached to a directed line
 (i) The state transition from the state 17 to the state 3: assignment of the x memory is released.
 (ii) The state transition from the state 13 to the state 3: assignment of the x memory is released.
 (iii) The state transition from the state 10 to the state 3: assignment of the x memory is released.
 (iv) The state transition from the state 29 to the state 26: the x memory is designated as a memory into which an image signal should be subsequently written, and assignment of the x memory is released (see a portion where the through image changes from 17 to 18 in FIG. 38).

(3) Supplementary explanation of the state transition in a case where ③ is attached to a directed line
When the suitable field delay is 3 in the state 8, the state proceeds to the state 9, 11 or 14 depending on the following branch conditions:
 (i) Conditions for the state transition from the state 8 to the state 9: A field memory into which an image signal should be subsequently written shall be a field memory which is three field memories ahead of the x memory in the order of writing. For example, if the x memory is C, a memory into which an image signal should be subsequently written shall be B (see a portion where the through image changes from 16 to 17 in FIG. 35).
 (ii) Conditions for the state transition from the state 8 to the state 11: A field memory into which an image signal should be subsequently written shall be a field memory which is two field memories ahead of the x memory in the order of writing. For example, if the x memory is C, a memory into which an image signal should be subsequently written shall be A (see a portion where the through image changes from 14 to 15 in FIG. 34).
 (iii) Conditions for the state transition from the state 8 to the state 14: A memory into which an image signal should be subsequently written shall be a field memory which is one field memory ahead of the x memory in the order of writing. For example, if the x memory is C, a memory into which an image signal should be subsequently written shall be D (see a portion where the through image changes from 12 to 13 in FIG. 33).

(4) Supplementary explanation of the state transition in a case where ④ is attached to a directed line
When the suitable field delay is 6 in the state 18, the state proceeds to the state 20, 22 or 24 depending on the following branch conditions:
 (i) Conditions for the state transition from the state 18 to the state 20: A field memory into which an image signal should be subsequently written shall be a field memory which is one field memory ahead of the x memory in the order of writing. For example, if the x memory is D, a memory into which an image signal should be subsequently written shall be A (see a portion where the through image changes from 11 to 12 in FIG. 38).
 (ii) Conditions for the state transition from the state 18 to the state 22: A field memory into which an image signal should be subsequently written shall be a field memory which is two field memories ahead of the x memory in the order of writing.
 (iii) Conditions for the state transition from the state 18 to the state 24: A field memory into which an image signal should be subsequently written shall be a field memory which is three field memories ahead of the x memory in the order of writing.

FIGS. 27 to 38 illustrate specific examples of a case where field memories are controlled by the algorithm conforming the state transition diagram of FIG. 26. In FIGS. 27 to 38, a numeral put in brackets indicates the number of a field selected as a main image signal, and a numeral put in parentheses indicates the number of a field selected as a sub-image signal.

Furthermore, a portion described in the form of a/b such as 2/6 indicates that the content of the field memory is rewritten from an image signal assigned a field number a to an image signal assigned a field number b. In addition, a number and a signal described in the form of α, β/γ in a column "relative number of read memory and type of writing" are as described above. As each of the field memories, a field memory into which new data can be written while old data is read out is used.

FIG. 27 shows a specific example of a case where the suitable field delay is 1. In this case, the state 1 shown in FIG. 26 is repeated. FIG. 28 shows a specific example of a case where the suitable field delay is 2. In this case, the state 2 shown in FIG. 26 is repeated. FIG. 29 shows a specific example of a case where the suitable field delay is 3. In this case, the state 3 shown in FIG. 26 is repeated.

When the state 1, 2 or 3 continues, the x memory is not set. When the state 1, 2 or 3 continues, α=0. Every time the field of the input image signal a is switched, therefore, the input image signal a is written into a write memory determined in a predetermined order out of the field memories A, B, C and D in memory control based on the step 1 in the 2D/3D converting processing (see FIG. 2). The predetermined order is A, B, C, D and A.

When the state 1, 2 or 3 continues, α=0. Every time the field of the input image signal a is switched, therefore, the input image signal a is selected as the main image signal d.

When the states 1, 2 and 3 respectively continue, β are respectively 1, 2 and 3. When the suitable field delay is 1, 2 or 3, therefore, an image signal written into a field memory once, twice or three times before a time point where an image signal of the succeeding field is inputted is read out from the field memory as the sub-image signal b.

FIG. 30 shows a specific example of a case where the suitable field delay is 4. In this case, the states 7 and 8 shown in FIG. 26 are alternately repeated.

When the state 7 proceeds to the state 8, field memory control data for the succeeding field is produced in accordance with α, β/γ in the state 8. In this case, the x memory has already been set. In this example, the field memory D is set to the x memory. Further, γ=w in the state 8. In the subsequent memory control, therefore, the input image signal a is written into a write memory determined in a predetermined order of writing out of the memories A, B and C other than the x memory.

Since α=0 in the state 8, the input image signal a is selected as the main image signal d in the subsequent memory control. Since β=2 in the state 8, an image signal written into a field memory (excluding the x memory) twice before a time point where an image signal of the succeeding field is inputted is read out from the field memory as the sub-image signal b in the subsequent memory control.

When the state 8 proceeds to the state 7, field memory control data for the succeeding field is produced in accordance with α, β/γ in the state 7.

In the state 7, γ=x, α=1, and β=3. In the subsequent memory control, therefore, the input image signal a is written into the x memory (=the memory D). In addition, in the subsequent memory control, an image signal written into a field memory (excluding the x memory) once before the time point where the image signal of the succeeding field is inputted is selected as the main image signal d. Further, in the subsequent memory control, an image signal written into a field memory (excluding the x memory) three times before the time point where the image signal of the succeeding field is inputted is read out from the field memory as the sub-image signal b.

FIG. 31 shows a specific example of a case where the suitable field delay is 5. In this case, the states 18 and 19 shown in FIG. 26 are alternately repeated.

When the state 18 proceeds to the state 19, field memory control data for the succeeding field is produced in accordance with α,β/γ in the state 19.

In the state 19, γ=w, α=x, and β=3. In the subsequent memory control, therefore, the input image signal a is written into a write memory determined in a predetermined order of writing out of the memories A, B and C other than the x memory. In addition, in the subsequent memory control, an image signal written into the x memory (=the memory D) is selected as the main image signal d. Further, in the subsequent memory control, an image signal written into a field memory (excluding the x memory) three times before a time point where an image signal of the succeeding field is inputted is read out from the field memory as the sub-image signal b.

When the state 19 proceeds to the state 18, field memory control data for the succeeding field is produced in accordance with α, β/γ in the state 18.

In the state 18, γ=x, α=0, and β=3. In the subsequent memory control, therefore, the input image signal a is written into the x memory (=the memory D). In addition, in the subsequent memory control, the input image signal a is selected as the main image signal d. Further, in the subsequent memory control, an image signal written into a field memory (excluding the x memory) three times before the time point where the image signal of the succeeding field is inputted is read out from the field memory as the sub-image signal b.

FIG. 32 shows a specific example of a case where the suitable field delay is 6. In this case, states 25 and 26 shown in FIG. 26 are alternately repeated.

When the state 25 proceeds to the state 26, field memory control data for the succeeding field is produced in accordance with α=0, β=3 and γ=w in the state 26. In this case, the x memory is not set. In the subsequent memory control, the input image signal a is written into a write memory determined in a predetermined order of writing out of the memories A, B, C and D. In addition, in the subsequent memory control, the input image signal a is selected as the main image signal d. Further, in the subsequent memory control, an image signal written into a field memory three times before a time point where an image signal of the succeeding field is inputted is read out from the field memory as the sub-image signal b.

When the state 26 proceeds to the state 25, field memory control data for the succeeding field is produced in accordance with α=1, β=4, and γ=n in the state 25. Specifically, in the subsequent memory control, the input image signal a is not written into a field memory. In addition, in the subsequent memory control, an image signal written into a field memory once before the time point where the image signal of the succeeding field is inputted is selected as the main image signal d. Further, in the subsequent memory control, an image signal written into a field memory four times before the time point where the image signal of the succeeding field is inputted is read out from the field memory as the sub-image signal b.

FIG. 33 shows a specific example of a case where the suitable field delay changes from 3 to 3 through 4.

When the suitable field delay changes from 3 to 4 (the through image changes from 7 to 8 in FIG. 33), the state 3 proceeds to the state 7 through the states 4, 5 and 6 in FIG. 26. When the state 3 proceeds to the state 4, a field memory which is three field memories ahead of a field memory into which an image signal will be written (the field memory D in this example) in the order of writing is assigned to the x memory, as already described as supplemental explanation.

Furthermore, in the process of the transition between the states, field memory control data for the succeeding field is produced in accordance with α, β and γ in the respective states 4, 5, 6 and 7 to which the state 3 proceeds.

When the suitable field delay changes from 4 to 3 (the through image changes from 12 to 13 in FIG. 33), there are three types of transitions depending on the branch conditions, as already described as supplementary explanation. In the example shown in FIG. 33, a field memory into which an image signal should be subsequently written is the field memory D, which is one field memory ahead of the field memory C which is the x memory in the order of writing. Therefore, the state 8 proceeds to the state 3 through the states 14, 15, 16 and 17 in FIG. 26. Further, in the process of the transition between the states, field memory control data for the succeeding field is produced in accordance with α, β and γ in the respective states 14, 15, 16 and 17 to which the state 8 proceeds. When the state 17 proceeds to the state 3, the setting of the x memory is released, as already described as supplementary explanation.

FIG. 34 shows a specific example of a case where the suitable field delay changes from 4 to 3. FIG. 34 shows an example in which the state 8 proceeds to the state 3 through the states 11, 12 and 13 in FIG. 26. When the state 13 proceeds to the state 3, the setting of the x memory is released, as already described as supplementary explanation.

FIG. 35 shows a specific example of a case where the suitable field delay changes from 4 to 3. FIG. 35 shows an example in which the state 8 proceeds to the state 3 through the states 9 and 10 in FIG. 26. When the state 10 proceeds to the state 3, the setting of the x memory is released, as already described as supplementary explanation.

FIG. 36 shows a specific example of a case where the suitable field delay changes from 6 to 4 through 5.

FIG. 36 shows an example in which in a case where the suitable field delay changes from 6 to 5 (the through image changes from 9 to 10 in FIG. 36), the state 25 proceeds to the state 18 through the state 27 in FIG. 26. When the state 25 proceeds to the state 27, a field memory (the field memory C in this example) which is one field memory ahead of a field memory into which an image signal will be written (the field memory B in this example) in the order of writing is assigned to the x memory, as already described as supplemental explanation.

In FIG. 36, when the suitable field delay changes from 5 to 4 (the through image changes from 13 to 14 in FIG. 36), the state 18 proceeds to the state 8 in FIG. 26.

FIG. 37 shows a specific example of a case where the suitable field delay changes from 6 to 4 through 5.

In FIG. 37, when the suitable field delay changes from 6 to 5 (the through image changes from 8 to 9 in FIG. 36), the state 26 proceeds to the state 19 through the state 28 in FIG. 26. When the state 26 proceeds to the state 28, a field memory into which an image signal will be written (the field memory B in this example) is assigned as the x memory, and a field memory (C in this example) which is one field memory ahead of the x memory in the order of writing (the field memory B in this example) is assigned as a field memory into which an image signal will be written, as already described as supplemental explanation.

In FIG. 37, when the suitable field delay changes from 5 to 4 (the through image changes from 12 to 13 in FIG. 37), the state 19 proceeds to the state 7 in FIG. 26.

FIG. 38 shows a specific example of a case where the suitable field delay changes from 4 to 6 through 5.

When the suitable field delay changes from 4 to 5 (the through image changes from 8 to 9 in FIG. 38), the state 8 proceeds to the state 18 in FIG. 26.

When the suitable field delay changes from 5 to 6 (the through image changes from 11 to 12 in FIG. 38), there are three types of transitions depending on the branch conditions, as already described as supplementary explanation. In the example shown in FIG. 38, a field memory into which an image signal should be subsequently written is the field memory A, which is one field memory ahead of the field memory D which is the x memory in the order of writing. Therefore, the state 18 proceeds to the state 26 through the states 20, 21, 22, 23, 24 and 29 in FIG. 26.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of converting two-dimensional images into three-dimensional images by producing from a two-dimensional image a main image and a sub-image delayed from the main image utilizing field memories, comprising the steps of:

writing the main image into the field memories for each field when the movement of the main image is fast;

writing the main image into the field memories at intervals of a predetermined number of fields when the movement of the main image is slow; and determining an image to be read out as the sub-image from the field memories on the basis of the speed of the movement of the main image.

2. The method according to claim 1, wherein the main image is written into the field memories at intervals of one field when the movement of the main image is slow.

3. The method according to claim 1, further comprising the steps of calculating the suitable field delay indicating how many fields are there from a field corresponding to the main image to a field corresponding to the sub-image on the basis of the speed of the movement of the main image, and judging the speed of the movement of the main image on the basis of the calculated field delay.

4. The method according to claim 2, further comprising the steps of calculating the suitable field delay from the main image to the sub-image on the basis of the speed of the movement of the main image, and judging the speed of the movement of the main image on the basis of the calculated field delay.

5. The method according to claim 3, wherein the field delay from the main image to the sub-image is so determined that the slower the movement of the main image is, the larger the field delay is.

6. The method according to claim 4, wherein the field delay from the main image to the sub-image is so determined that the slower the movement of the main image is, the larger the field delay is.

7. A method of converting two-dimensional images into three-dimensional images by producing from a two-dimensional input image a main image and a sub-image delayed from the main image, comprising the steps of:

providing field memories for storing the two-dimensional input image in units of fields;

writing the two-dimensional input image into the field memories for each field when the movement of the two-dimensional input image is fast;

writing the two-dimensional input image into the field memories at intervals of a predetermined number of fields when the movement of the two-dimensional input image is slow; and selecting the main image out of the two-dimensional input image and images in the field memories and selecting the sub-image out of the images in the field memories so that a field delay from the main image to the sub-image becomes a value determined on the basis of the speed of the movement of the two-dimensional input image.

8. A method of converting two-dimensional images into three-dimensional images by producing from a two-dimensional input image a main image and a sub-image delayed from the main image, comprising the steps of:

providing field memories for storing the two-dimensional input image in units of fields;

writing the two-dimensional input image into the field memories for each field when the movement of the two-dimensional input image is fast;

writing the two-dimensional input image into the field memories excluding one field memory at intervals of a predetermined number of fields when the movement of the two-dimensional input image is slow, and writing a two-dimensional input image of a field which is not written into the other field memories into the excluded one field memory; and selecting the main image out of the two-dimensional input image and images in the field memories and selecting the sub-image out of the images in the field memories so that a field delay from the main image to the sub-image becomes a value determined on the basis of the speed of the movement of the two-dimensional input image.

9. A method of converting two-dimensional images into three-dimensional images by producing from a two-dimensional input image a main image and a sub-image delayed from the main image, comprising the steps of:

providing field memories for storing the two-dimensional input image in units of fields;

writing the two-dimensional input image into the field memories for each field when the movement of the two-dimensional input image is fast;

performing processing in the write mode conforming to the speed of the movement of the two-dimensional input image out of the first write mode in which the two-dimensional input image is written into the field memories at intervals of a predetermined number of fields when the movement of the two-dimensional input image is slow and the second write mode in which the two-dimensional input image is written into the field memories excluding one field memory at intervals of a predetermined number of fields and a two-dimensional input image of a field which is not written into the other field memories is written into the excluded one field memory; and selecting the main image out of the two-dimensional input image and images in the field memories and the sub-image is selected out of the images in the field memories so that the field delay from the main image to the sub-image becomes a value determined on the basis of the speed of the movement of the two-dimensional input image.

10. The method according to claim 1, further comprising a step of detecting the speed of movement of the main image, wherein said determining step is based upon the detected speed of movement of the main image.

* * * * *